US012800872B2

(12) United States Patent
Osada et al.

(10) Patent No.: US 12,800,872 B2
(45) Date of Patent: Nov. 17, 2026

(54) MODULE DRIVE DEVICE

(71) Applicant: ALPS ALPINE CO., LTD., Tokyo (JP)

(72) Inventors: Hiroshi Osada, Tokyo (JP); Changxing Wang, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 210 days.

(21) Appl. No.: 18/934,704

(22) Filed: Nov. 1, 2024

(65) Prior Publication Data

US 2025/0147266 A1 May 8, 2025

(30) Foreign Application Priority Data

Nov. 6, 2023 (JP) ................................ 2023-189607

(51) Int. Cl.
*G02B 7/08* (2021.01)
*G02B 27/64* (2006.01)

(52) U.S. Cl.
CPC ............ *G02B 7/08* (2013.01); *G02B 27/646* (2013.01)

(58) Field of Classification Search
CPC ........................................................ G02B 7/08
See application file for complete search history.

(56) References Cited

U.S. PATENT DOCUMENTS

2021/0124144 A1* 4/2021 Chen ........................ G02B 7/08

FOREIGN PATENT DOCUMENTS

JP 2012-217179 11/2012
WO 2022/219984 10/2022

* cited by examiner

*Primary Examiner* — Edmond C Lau
(74) *Attorney, Agent, or Firm* — IPUSA, PLLC

(57) ABSTRACT

A module drive device that includes: a movable-side member that includes a module holder configured to hold an optical module that includes a lens body, a substrate member, and an image sensor that is mounted on an upper surface of the substrate member so as to face the lens body in an optical axis direction; a fixed-side member mounted so as not to be movable relative to a heat dissipation member that dissipates heat generated by the image sensor; a driver that moves the movable-side member with respect to the fixed-side member by utilizing a plurality of shape-memory alloy wires provided between the fixed-side member and the movable-side member; and a biasing unit for biasing the module holder to a side of the heat dissipation member that faces a lower surface of the substrate member.

9 Claims, 12 Drawing Sheets

MODULE DRIVE DEVICE

CROSS-REFERENCE TO RELATED APPLICATIONS

The present application is based on and claims priority to Japanese Patent Application No. 2023-189607 filed on Nov. 6, 2023, the entire contents of which are hereby incorporated by reference.

BACKGROUND

1. Field of the Invention

The present disclosure relates to a module drive device.

2. Description of the Related Art

Conventionally, an imaging unit provided with a movable heat sink for dissipating heat generated by an image sensor to the outside is known (see Japanese Laid-Open Patent Application No. 2012-217179).

SUMMARY

A module drive device according to an embodiment of the present disclosure includes: a movable-side member that includes a module holder configured to hold an optical module that includes a lens body, a substrate member, and an image sensor that is mounted on an upper surface of the substrate member so as to face the lens body in an optical axis direction; a fixed-side member mounted so as not to be movable relative to a heat dissipation member that dissipates heat generated by the image sensor; a driver that moves the movable-side member with respect to the fixed-side member by utilizing a plurality of shape-memory alloy wires provided between the fixed-side member and the movable-side member; and a biasing unit for biasing the module holder to a side of the heat dissipation member that faces a lower surface of the substrate member. The biasing unit biases the module holder such that the substrate member and the heat dissipation member, which are separated from each other when the shape-memory alloy wire is energized, are close to or in contact with contact each other when the shape-memory alloy wire is not energized.

DETAILED DESCRIPTION OF THE DISCLOSURE

The imaging unit described above is configured such that the movable heat sink and an image sensor can be thermally connected by moving the movable heat sink as required.

However, the imaging unit is equipped with an electromagnetic drive mechanism for moving the movable heat sink. Therefore, the imaging unit needs to supply electric power to the electromagnetic drive mechanism when moving the movable heat sink. Accordingly, a large amount of electric power may be consumed for dissipating heat from the image sensor.

Therefore, it is desirable to provide a module drive device that can dissipate heat more efficiently from the image sensor.

Hereinafter, an optical device OD including a module drive device MD according to an embodiment of the present disclosure will be described with reference to the drawings. The optical device OD is a device including a heat dissipation member HR, an optical module OM, and a module drive device MD, and is mounted on a portable device such as a smartphone, for example.

Figure 1:
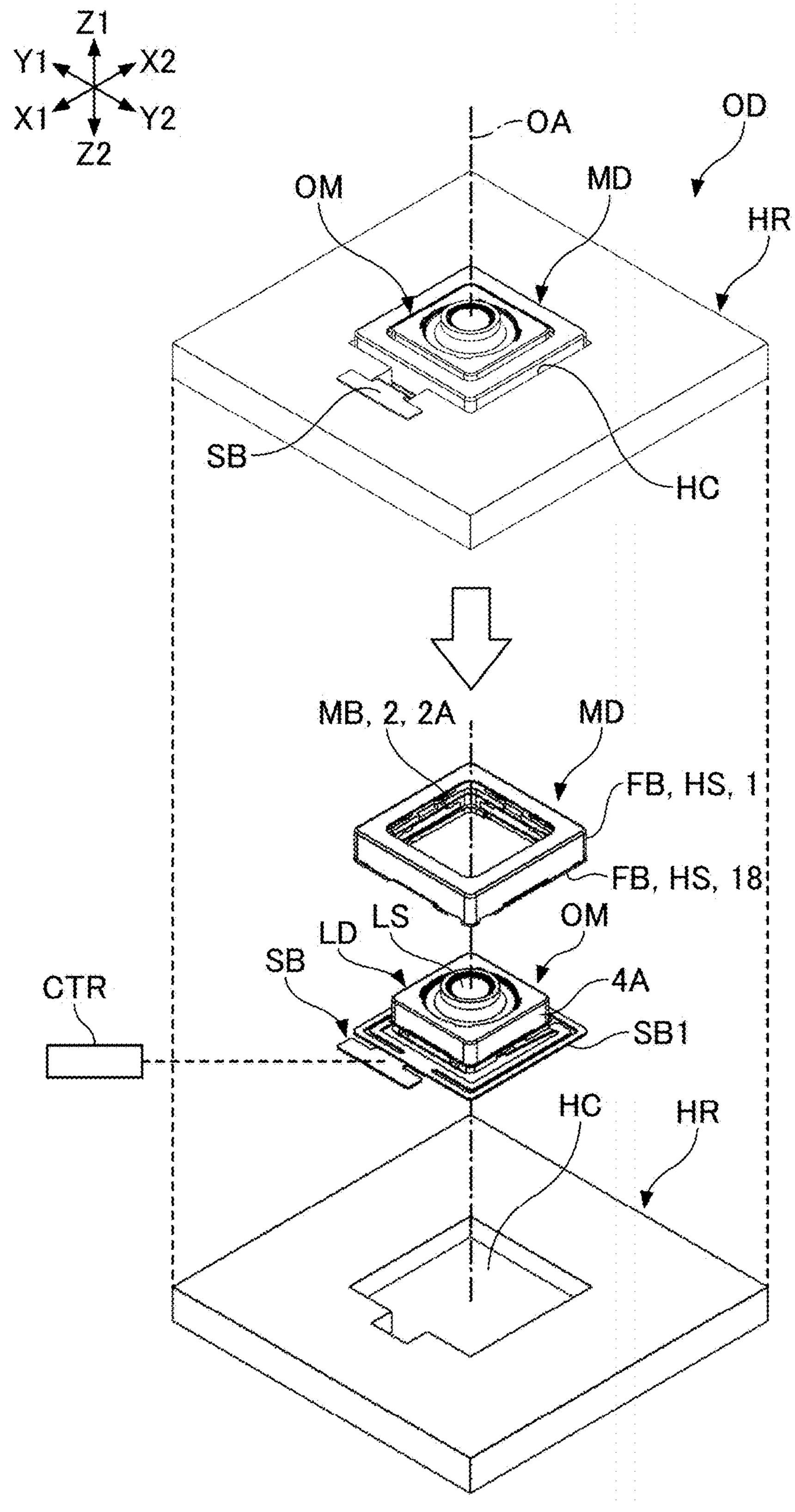
FIG. 1 is a perspective view of a heat dissipation member, an optical module, and a module drive device.
Figure 2:
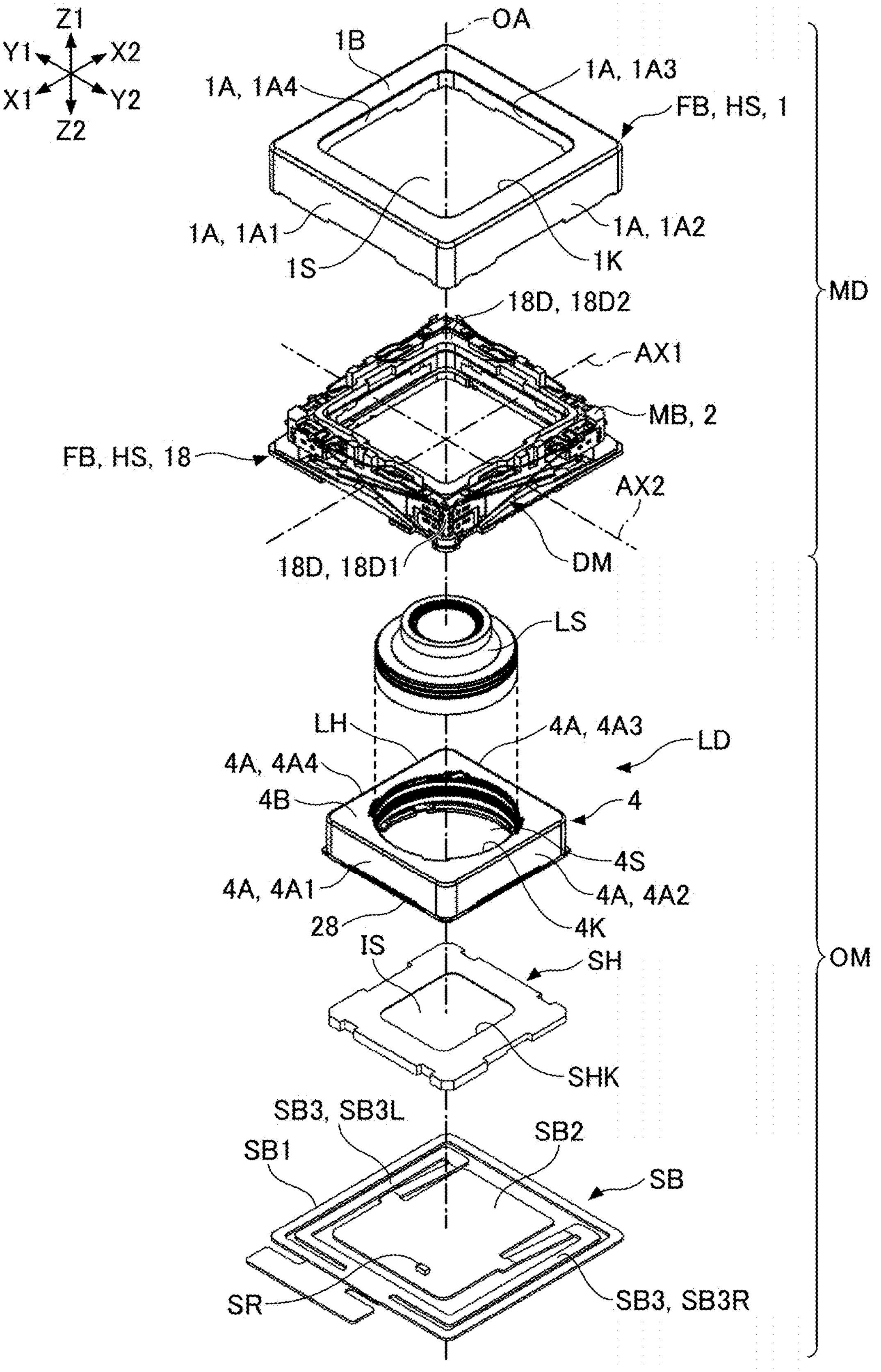
FIG. 2 is an exploded perspective view of the optical module and the module drive device.
Figure 3:
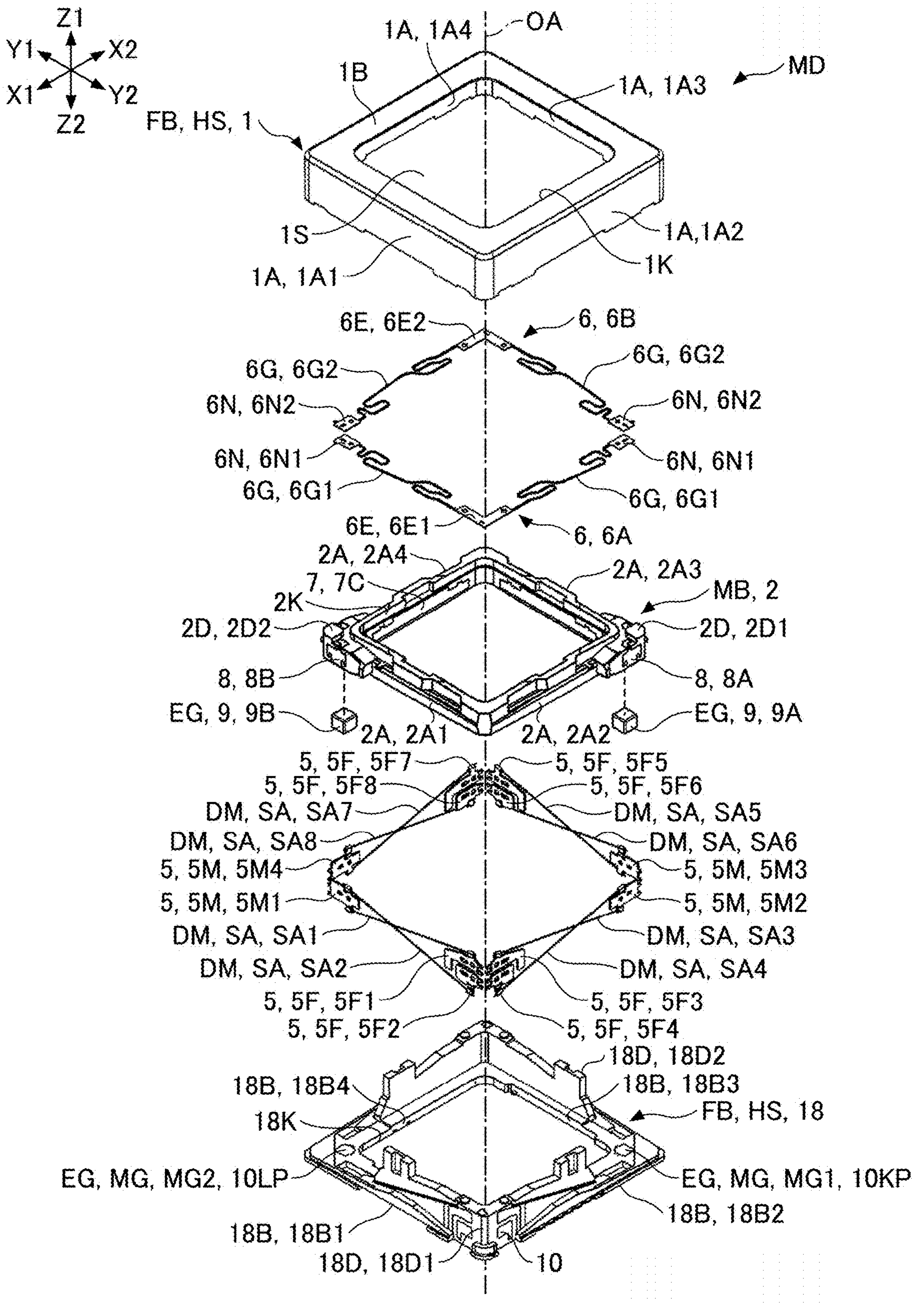
FIG. 3 is a more detailed exploded perspective view of the module drive device.

The module drive device MD is configured such that the optical module OM can be tilted. FIG. 1 is a perspective view of the heat dissipation member HR, the optical module OM, and the module drive device MD. More specifically, an upper figure (above a block arrow) of FIG. 1 is a perspective view of the module drive device MD in a state in which the optical module OM is mounted and arranged in the heat dissipation member HR. The lower figure (below the block arrow) of FIG. 1 is a perspective view of the module drive device MD being removed from the heat dissipation member HR and in a state the optical module OM is removed. FIG. 2 is an exploded perspective view of the optical module OM and the module drive device MD. FIG. 3 is a more detailed exploded perspective view of the module drive device MD.

In FIGS. 1, 2, and 3, X1 represents one direction of an X-axis included in a three-dimensional orthogonal coordinate system, and X2 represents the other direction of the X-axis. Y1 represents one direction of a Y-axis included in the three-dimensional orthogonal coordinate system, and Y2 represents the other direction of the Y-axis. Similarly, Z1 represents one direction of a Z-axis included in the three-dimensional orthogonal coordinate system, and Z2 represents the other direction of the Z-axis. In FIGS. 1, 2 and 3, an X1 side of the module drive device MD corresponds to a front (front side) of the module drive device MD, and the X2 side of the module drive device MD corresponds to a back (rear side) of the module drive device MD. Furthermore, the Y1 side of the module drive device MD corresponds to a left side of the module drive device MD, and the Y2 side of the module drive device MD corresponds to a right side of the module drive device MD. Additionally, a Z1 side of the module drive device MD corresponds to an upper side (subject side) of the module drive device MD, and the Z2 side of the module drive device MD corresponds to a lower side (image sensor side) of the module drive device MD. The same applies to other drawings.

The optical module OM is a module that includes an optical element drive device for driving an optical element. In the illustrated example, the optical module OM includes a lens drive device LD for driving a lens body LS which is an example of the optical element. The lens body LS is, for example, a cylindrical lens barrel including at least one lens. A central axis of the lens barrel is arranged along an optical axis OA.

More specifically, as illustrated in FIG. 2, the optical module OM includes the lens body LS, the lens drive device LD, an image sensor IS, an image sensor holder SH, and a substrate member SB.

The lens drive device LD is configured such that the lens body LS can be moved at least along the optical axis direction (Z-axis direction) by using a voice coil motor formed of a coil and a magnet. That is, the lens drive device LD is configured to include an autofocus driver AD (see FIG. 11). The optical axis direction includes an axial direction of the optical axis OA and a direction parallel to the axial direction of the optical axis OA. In the illustrated example, although the lens drive device LD is configured to move the lens body LS by using the voice coil motor, a member or a mechanism other than the voice coil motor, such as a shape-memory alloy wire or a piezoelectric element may be used to move the lens body LS. Furthermore, an autofocus driver AD may be omitted. In this case, the optical device OD functions as a fixed-focus camera with a camera-shake correction function.

The lens drive device LD includes a movable-side cover member 4 and a movable-side base member 28. The movable-side cover member 4 and the movable-side base member 28 function as movable-side casings and cover members constituting the lens drive device LD. In the illustrated example, the movable-side cover member 4 is formed of a non-magnetic metal such as austenitic stainless steel. However, the movable-side cover member 4 may be formed of a magnetic metal.

Specifically, as illustrated in FIG. 2, the movable-side cover member 4 has an outer shape of a bottomless box defining a housing portion 4S. The movable-side cover member 4 includes a rectangular cylindrical side-plate portion 4A and a top-plate portion 4B having a rectangular annular shape and a flat plate shape provided so as to be continuous with an upper end (an end on the Z1 side) of the side-plate portion 4A. A substantially circular opening 4K is formed in a center of the top-plate portion 4B. The side-plate portion 4A includes a first side-plate portion 4A1 to a fourth side-plate portion 4A4. The first side-plate portion 4A1 and the third side-plate portion 4A3 face each other. The second side-plate portion 4A2 and the fourth side-plate portion 4A4 face each other. The first side-plate portion 4A1 and the third side-plate portion 4A3 extend perpendicularly to the second side-plate portion 4A2 and the fourth side-plate portion 4A4.

The movable-side base member 28 is a substantially rectangular frame-shaped member made of a synthetic resin, and is mounted on the image sensor holder SH mounted on the substrate member SB.

The image sensor holder SH is configured to house and hold the image sensor IS. In the illustrated example, the image sensor holder SH is a substantially rectangular frame-shaped member made of a synthetic resin. Its upper surface is bonded to a lower surface of the movable-side base member 28 by an adhesive. The image sensor holder SH is formed with an opening SHK for exposing the image sensor IS. An upwardly recessed portion having an open lower side is formed on the lower surface of the image sensor holder SH surrounding the opening SHK, and the image sensor IS is arranged in the recessed portion (not illustrated).

The substrate member SB is a member for achieving an electrical connection between each of the module drive device MD and the lens drive device LD and a device outside the module drive device MD such as a controller CTR. In the illustrated example, the controller CTR is a microcomputer including a CPU, a volatile storage device, a nonvolatile storage device, etc. The substrate member SB is a flexible printed circuit board. The printed circuit board is provided with an outer portion SB1 fixed to the module drive device MD, an inner portion SB2 fixed to the image sensor holder SH, and a connection portion SB3 connecting the outer portion SB1 and the inner portion SB2. The connection portion SB3 includes a left connection portion SB3L and a right connection portion SB3R.

The image sensor IS is mounted on the inner portion SB2. Specifically, the image sensor IS is fixed to the inner portion SB2 by a conductive adhesive or solder. Further, the image sensor holder SH houses the image sensor IS in a state where an imaging surface of the image sensor IS is exposed from the opening SHK, and is bonded to an upper surface of the inner portion SB2 by an adhesive. At least a part of an outer shape of the image sensor IS is held by the image sensor holder SH. The image sensor holder SH functions as a spacer member that is disposed between the inner portion SB2 and the lens drive device LD (movable-side base member 28). A temperature sensor SR such as a thermistor for detecting a temperature of the image sensor IS is attached to the inner portion SB2. The substrate member SB may be a combination of a rigid substrate on which the image sensor IS is mounted and a flexible printed circuit board connected to the rigid substrate.

The heat dissipation member HR is a member for dissipating heat generated by the image sensor IS and is formed of, for example, aluminum or a copper alloy. In the illustrated example, the heat dissipation member HR contacts the substrate member SB and is configured to dissipate heat of the image sensor IS to the outside through the substrate member SB. In the illustrated example, the optical module OM attached to the module drive device MD is, as illustrated in the upper figure of FIG. 1, housed in a recess HC formed in the heat dissipation member HR, together with the module drive device MD. The lower surface of the outer portion SB1 of the substrate member SB is fixed to a bottom surface of the recess HC by an adhesive. The heat dissipation member HR may be a part of a casing of a portable device such as a smartphone.

As illustrated in FIGS. 1 and 2, the module drive device MD includes a cover member 1 which is a part of a fixed-side member FB provided so as not to be movable relative to the heat dissipation member HR. The cover member 1 is configured so as to function as a part of a housing HS covering the members constituting the module drive device MD. In the illustrated example, the cover member 1 is made of a non-magnetic metal such as austenitic stainless steel. However, the cover member 1 may be made of a magnetic metal.

More specifically, as illustrated in FIG. 2, the cover member 1 has an outer shape of a bottomless box defining a housing portion 1S. The cover member 1 includes a rectangular cylindrical side-plate portion 1A, and a rectangular annular and flat top-plate portion 1B provided so as to be continuous with an upper end (end on the Z1 side) of the side-plate portion 1A. A substantially rectangular opening 1K is formed in a center of the top-plate portion 1B. The side-plate portion 1A includes a first side-plate portion 1A1 to a fourth side-plate portion 1A4. The first side-plate portion 1A1 and the third side-plate portion 1A3 face each other, and the second side-plate portion 1A2 and the fourth side-plate portion 1A4 face each other. The first side-plate portion 1A1 and the third side-plate portion 1A3 extend perpendicularly to the second side-plate portion 1A2 and the fourth side-plate portion 1A4.

In the cover member 1, as illustrated in FIGS. 2 and 3, a module holder 2, a metal member 5, a flexible metal member 6, an embedded metal member 7, a movable-side conductive member 8, a magnet 9, a fixed-side embedded member 10, a base member 18, a shape-memory alloy wire SA, and the like are housed. The module holder 2 is included in a movable-side member MB, and the base member 18 is included in the fixed-side member FB. Additionally, as illustrated in FIG. 1, the cover member 1 is bonded to the base member 18 by an adhesive.

The module holder 2 is a rectangular frame-shaped member for holding the optical module OM. The module holder 2 is formed by injection molding a synthetic resin such as a liquid crystal polymer (LCP). In the illustrated example, the module holder 2 includes a frame portion 2A and a pedestal portion 2D as illustrated in FIG. 3.

The frame portion 2A is formed of four extended portions (a first extended portion 2A1 to a fourth extended portion 2A4) surrounding a rectangular opening 2K. A pedestal portion 2D is a portion protruding radially outward from the frame portion 2A. The pedestal portion 2D includes a first pedestal portion 201 disposed at a right rear corner of the frame portion 2A and a second pedestal portion 2D2 disposed at a left front corner of the frame portion 2A.

A part of the embedded metal member 7 is exposed from a surface of the module holder 2 so as to be contactable with the optical module OM. A remaining part of the embedded metal member 7 is a metal member embedded in the module holder 2. In the present embodiment, the embedded metal member 7 is formed of a metal such as stainless steel or copper, and is partially embedded in the frame portion 2A of the module holder 2 by insert molding.

In the illustrated example, the embedded metal member 7 includes an exposed portion 7C exposed to an inner peripheral surface of the frame portion 2A of the module holder 2 (an inner peripheral surface formed by the first extended portion 2A1 to the fourth extended portion 2A4). As illustrated in FIG. 1, an outer peripheral surface of the side-plate portion 4A of the movable-side cover member 4 of the optical module OM is configured to be bonded to the inner peripheral surface of the frame portion 2A of the module holder 2 by an adhesive. Specifically, at least a part of the outer peripheral surface of the side-plate portion 4A is configured so as to be bonded to the exposed portion 7C by an adhesive. Therefore, this configuration can enhance an adhesive strength between the side-plate portion 4A and the module holder 2 as compared with a configuration in which the embedded metal member 7 is not embedded in the module holder 2. The adhesive strength between the side-plate portion 4A and the module holder 2 is higher than that between a metal and a synthetic resin material.

A part of the movable-side conductive member 8 is exposed from the module holder 2 so as to be in contactable with the metal member 5 and the flexible metal member 6. The remaining part of the movable-side conductive member 8 is embedded in the module holder 2. In the present embodiment, the movable-side conductive member 8 is a member formed of a metal such as stainless steel or copper. The movable-side conductive member 8 is partially embedded in the pedestal portion 2D of the module holder 2 by insert molding. In the illustrated example, the movable-side conductive member 8 includes a first movable-side conductive member 8A partially embedded in the first pedestal portion 2D1 and a second movable-side conductive member 8B partially embedded in the second pedestal portion 2D2.

The magnet 9 is a member that is included in the biasing unit EG for biasing the module holder 2 along the optical axis direction. In the present embodiment, the magnet 9 is housed and fixed in a recess 2R (see FIG. 8) formed in an opposing portion 2F (see FIG. 8) of the module holder 2, which faces an upper surface of the base member 18 in the optical axis direction. The magnet included in the biasing unit EG may be a magnet constituting a voice coil motor in the lens drive device LD. In this case, the magnet 9 may be omitted.

The fixed-side embedded member 10 is a member embedded in the fixed-side member FB. In the present embodiment, the fixed-side embedded member 10 is formed of a magnetic metal such as ferritic stainless steel or iron. The fixed-side embedded member 10 is partially embedded in the base member 18 by insert molding.

As illustrated in FIG. 2, the module drive device MD includes a driver DM that rotates (swings) the module holder 2 about a first axis AX1 and a second axis AX2. In the illustrated example, the first axis AX1 and the second axis AX2 are arranged so as to cross the optical axis OA at a center point in a top view of the image sensor IS.

The driver DM is formed of the shape-memory alloy wire SA which is an example of a shape memory actuator. In the illustrated example, the shape-memory alloy wire SA includes a first wire SA1 to an eighth wire SA8, as illustrated in FIG. 3. The temperature of the shape-memory alloy wire SA increases when an electric current flows, and the shape-memory alloy wire SA contracts according to the increase in the temperature. The driver DM can swing the module holder 2 by utilizing the contraction of the shape-memory alloy wire SA.

The base member 18 is molded by injection molding by using a synthetic resin such as liquid crystal polymer (LCP). In the illustrated example, as illustrated in FIG. 3, the base member 18 has a substantially rectangular outline in a top view and includes an opening 18K in the center. Specifically, the base member 18 includes the substantially rectangular opening 18K surrounded by a rectangular annular base 18B. The base 18B includes a first base portion 18B1 to a fourth base portion 18B4.

A pedestal portion 18D is formed on the upper surface of the base member 18, which is the subject side surface (Z1-side surface). The pedestal portion 18D includes: a first pedestal portion 18D1 that extends upward from the first base portion 18B1 and the second base portion 18B2, and has an L-shape in a top view; and a second pedestal portion 18D2 that extends upward from the third base portion 18B3 and the fourth base portion 18B4, and has an L-shape in a top view. The first pedestal portion 18D1 and the second pedestal portion 18D2 are arranged so as to face each other with the optical axis OA therebetween.

The flexible metal member 6 is configured to be able to connect the fixed-side member FB (base member 18) and the movable-side member MB (module holder 2). In the present embodiment, the flexible metal member 6 is a conductive connecting member (plate spring) that connects the module holder 2 and the base member 18. For example, the flexible metal member 6 is formed of a metal plate mainly made of a copper alloy, a titanium-copper alloy (titanium-copper), a copper-nickel alloy (nickel-tin copper), or the like as a main material.

Specifically, the flexible metal member 6 includes an inner portion 6N fixed to the module holder 2, an outer portion 6E fixed to the base member 18, and an elastic arm portion 6G connecting the inner portion 6N and the outer portion 6E. In the illustrated example, the flexible metal member 6 includes a first flexible metal member 6A and a second flexible metal member 6B, as illustrated in FIG. 3. The first flexible metal member 6A includes a first inner portion 6N1, a first outer portion 6E1, and a first elastic arm portion 6G1. The second flexible metal member 6B includes a second inner portion 6N2, a second outer portion 6E2, and a second elastic arm portion 6G2. The inner portion 6N is joined to an upper end surface of the pedestal portion 2D of the module holder 2 by caulking. The outer portion 6E is joined to an upper end surface of the pedestal portion 18D of the base member 18 by caulking. The joining of the flexible metal member 6 to the module holder 2 and the base member 18 may be achieved by an adhesive.

As described above, the flexible metal member 6 is formed on the upper surface of the pedestal portion 2D of the module holder 2 and on the base member 18 of the pedestal portion 18D so as to join the upper surfaces thereof. More specifically, the flexible metal member 6 is configured such that the first flexible metal member 6A connects upper surfaces of the first pedestal portion 2D1 and the second pedestal portion 2D2 with an upper surface of the first pedestal portion 18D1, and the second flexible metal member 6B connects the upper surfaces of the first pedestal portion 201 and the second pedestal portion 2D2 with an upper surface of the second pedestal portion 18D2.

The metal member 5 is a member to which ends of the shape-memory alloy wires SA are fixed. In the present embodiment, the metal member 5 is a member made of a non-magnetic metal such as phosphor bronze, and includes a fixed-side metal member 5F and a movable-side metal member 5M. The fixed-side metal member 5F is configured to be fixed to the base member 18. The movable-side metal member 5M is configured to be fixed to the module holder 2.

More specifically, the fixed-side metal member 5F is also referred to as a fixed-side terminal plate and includes a first fixed-side metal member 5F1 to an eighth fixed-side metal member 5F8. The movable-side metal member 5M is also referred to as a movable-side terminal plate and includes a first movable-side metal member 5M1 to a fourth movable-side metal member 5M4.

One end of each of the first wire SA1 to the eighth wire SA8 is fixed to the fixed-side metal member 5F by crimping, welding, or the like, and the other end is fixed to the movable-side metal member 5M by crimping, welding, or the like. When a current flows in each of the first wire SA1 to the eighth wire SA8, each of the first wire SA1 to the eighth wire SA8 becomes straight along an outer surface of the frame portion 2A of the module holder 2, and the movable-side member MB (module holder 2) can be swung with respect to the fixed-side member FB (cover member 1 and base member 18).

Figure 4:
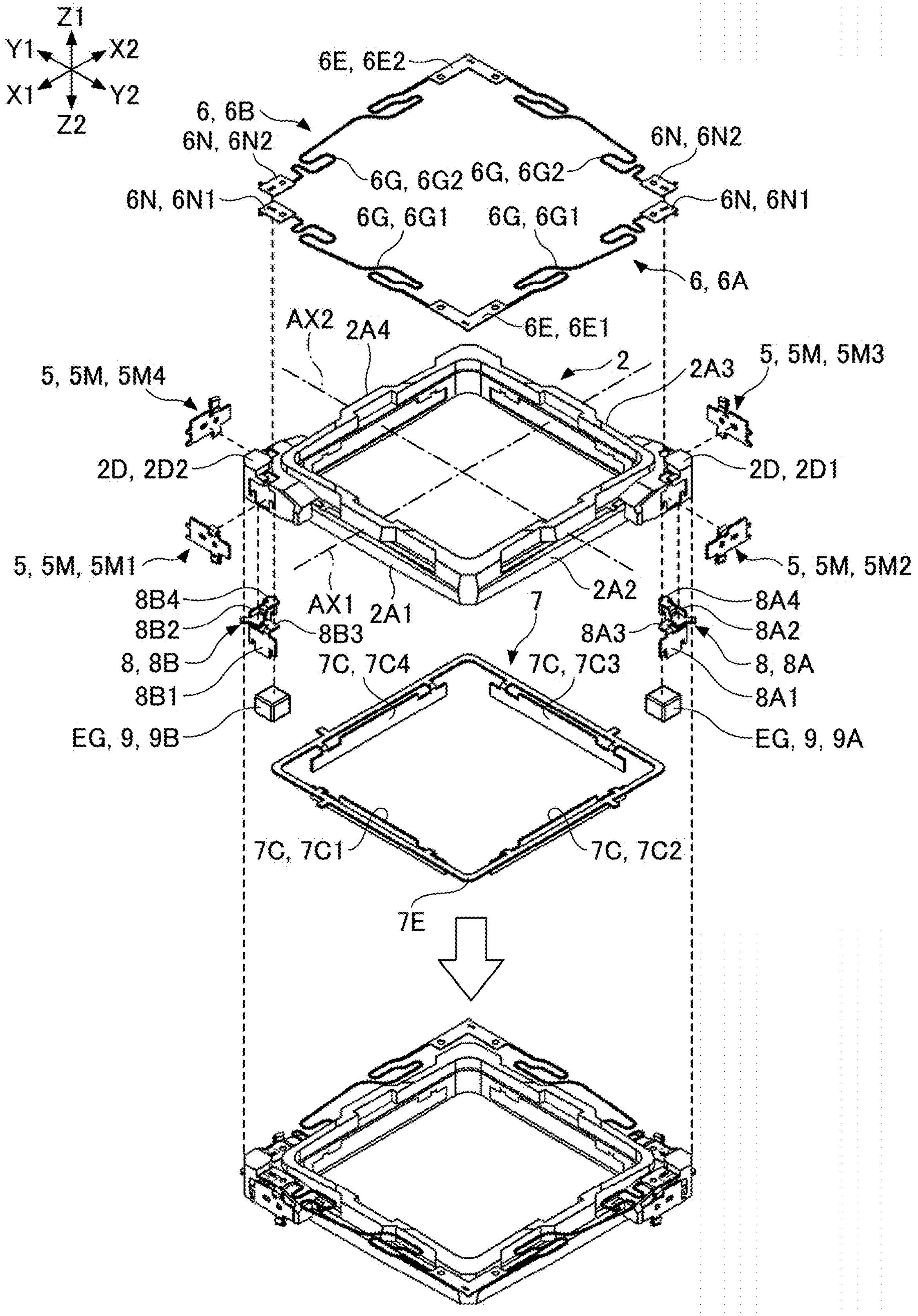
FIG. 4 is a perspective view of a module holder, a movable-side metal member, a flexible metal member, an embedded metal member, a movable-side conductive member, and a magnet.

The following describes a positional relationship between the module holder 2 and each of the movable-side metal member 5M, the flexible metal member 6, the embedded metal member 7, and the movable-side conductive member 8, with reference to FIG. 4. FIG. 4 is a perspective view of the module holder 2, the movable-side metal member 5M, the flexible metal member 6, the embedded metal member 7, the movable-side conductive member 8, and the magnet 9. More specifically, an upper figure of FIG. 4 (figure above a block arrow) illustrates the module holder 2, the movable-side metal member 5M, and the movable-side metal member 5M, each in a separated state. A lower figure of FIG. 4 (figure below the block arrow) is a perspective view of the module holder 2 to which the movable-side metal member 5M, the flexible metal member 6, and the magnet 9 are attached, and in which the embedded metal member 7 and the movable-side conductive member 8 are embedded.

In the illustrated example, the first movable-side metal member 5M1 is welded to the front exposed portion 8B1 of the second movable-side conductive member 8B embedded in the second pedestal portion 2D2 of the module holder 2. A second movable-side metal member 5M2 is welded to a right exposed portion 8A1 of the first movable-side conductive member 8A embedded in the first pedestal portion 2D1 of the module holder 2. A third movable-side metal member 5M3 is welded to a rear exposed portion 8A2 of the first movable-side conductive member 8A embedded in the first pedestal portion 2D1 of the module holder 2. The fourth movable-side metal member 5M4 is welded to a left exposed portion 8B2 of the second movable-side conductive member 8B embedded in the second pedestal portion 2D2 of the module holder 2. With this configuration, an adhesive for fixing the movable-side metal member 5M to the pedestal portion 2D may be omitted.

One of the two first inner portions 6N1 of the first flexible metal member 6A is welded to an upper-right exposed portion 8A3 of the first movable-side conductive member 8A embedded in the first pedestal portion 2D1 of the module holder 2. Similarly, the other of the two first inner portions 6N1 of the first flexible metal member 6A is welded to an upper-front exposed portion 8B3 of the second movable-side conductive member 8B embedded in the second pedestal portion 2D2 of the module holder 2. Similarly, one of the two second inner portions 6N2 of the second flexible metal member 6B is welded to an upper-rear exposed portion 8A4 of the first movable-side conductive member 8A embedded in the first pedestal portion 201 of the module holder 2. Similarly, the other of the two second inner portions 6N2 of the second flexible metal member 6B is welded to an upper-left exposed portion 8B4 of the second movable-side conductive member 8B embedded in the second pedestal portion 2D2 of the module holder 2.

The embedded metal member 7 includes an embedded portion 7E embedded in the frame portion 2A of the module holder 2, and the exposed portion 7C exposed to the inner peripheral surface of the frame portion 2A of the module holder 2. The embedded metal member 7 is formed by punching and bending a single metal plate. In the illustrated example, the exposed portion 7C includes: a first exposed portion 7C1 exposed to an inner surface of the first extended portion 2A1; a second exposed portion 7C2 exposed to an inner surface of the second extended portion 2A2, a third exposed portion 7C3 exposed to an inner surface of the third extended portion 2A3, and a fourth exposed portion 7C4 exposed to an inner surface of the fourth extended portion 2A4.

The magnet 9 includes a first magnet 9A and a second magnet 9B which are bipolar permanent magnets having a substantially cubic shape. The first magnet 9A is fitted into a first recess 2R1 formed on the lower surface of the first pedestal portion 2D1 which is a part of the opposing portion 2F (see FIG. 8) of the module holder 2 and fixed with an adhesive. The second magnet 9B is fitted into a second recess 2R2 formed on the lower surface of the second pedestal portion 2D2 which is another part of the opposing portion 2F, and fixed with an adhesive.

Figure 5:
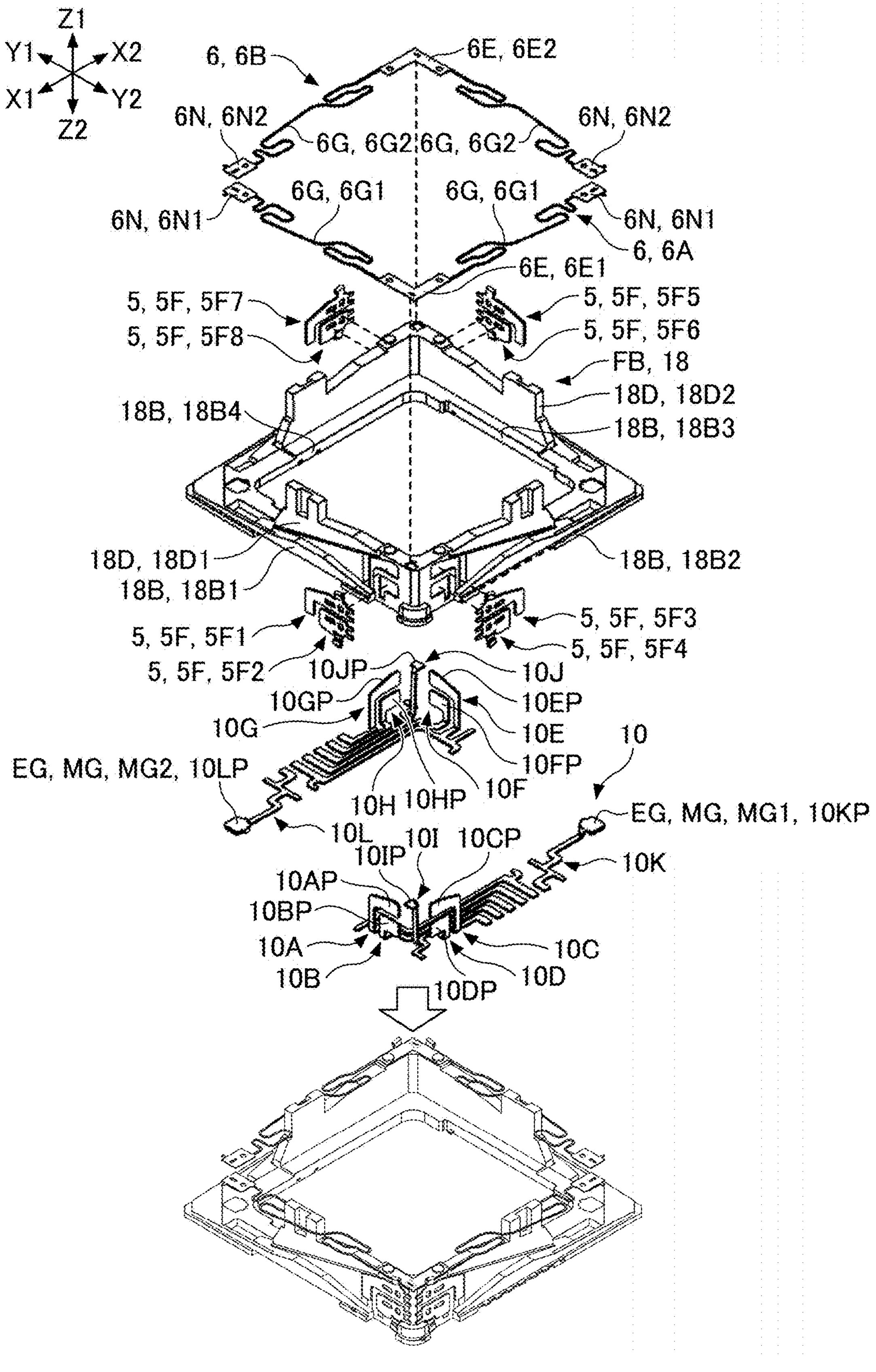
FIG. 5 is a perspective view of a fixed-side metal member, the flexible metal member, a fixed-side embedded member, and a base member.

Referring now to FIG. 5, a positional relationship between the base member 18 and each of the fixed-side metal member 5F, the flexible metal member 6, and the fixed-side embedded member 10 will be described. FIG. 5 is a perspective view of the fixed-side metal member 5F, the flexible metal member 6, the fixed-side embedded member 10, and the base member 18. Specifically, an upper figure of FIG. 5 (figure above the block arrow) is a perspective view of the fixed-side metal member 5F, the flexible metal member 6, the fixed-side embedded member 10, and the base member 18, each in a separated state. A lower figure of FIG. 5 (figure below the block arrow) is a perspective view of the base member 18 to which the fixed-side metal member 5F and the flexible metal member 6 are attached and the fixed-side embedded member 10 is embedded.

The fixed-side embedded member 10 is a member embedded in the fixed-side member FB. In the present embodiment, the fixed-side embedded member 10 is formed of a magnetic metal such as iron, and is embedded in the base member 18 such that the fixed-side embedded member 10 is partially exposed from the surface of the base member 18. In the illustrated example, the fixed-side embedded member 10 includes: a first fixed-side embedded member 10A to a tenth fixed-side embedded member 10J which are members to electrically connect the fixed-side metal member 5F and the flexible metal member 6 to the substrate member SB; and an eleventh fixed-side embedded member 10K and a twelfth fixed-side embedded member 10L, which include a magnetic member MG constituting the biasing unit EG.

Specifically, the first fixed-side embedded member 10A embedded in the first pedestal portion 18D1 includes a first exposed portion 10AP exposed on a front surface of the first pedestal portion 18D1. The first fixed-side metal member 5F1 is welded to the first exposed portion 10AP and is electrically connected to the substrate member SB through the first fixed-side embedded member 10A.

The second fixed-side embedded member 10B embedded in the first pedestal portion 18D1 includes a second exposed portion 10BP exposed on the front surface of the first pedestal portion 18D1. A second fixed-side metal member 5F2 is welded to the second exposed portion 10BP and is electrically connected to the substrate member SB through the second fixed-side embedded member 10B.

A third fixed-side embedded member 10C embedded in the first pedestal portion 18D1 includes a third exposed portion 10CP exposed on a right surface of the first pedestal portion 18D1. A third fixed-side metal member 5F3 is welded to the third exposed portion 10CP and is electrically connected to the substrate member SB through the third fixed-side embedded member 10C.

A fourth fixed-side embedded member 10D embedded in the first pedestal portion 18D1 includes a fourth exposed portion 10DP exposed on the right surface of the first pedestal portion 18D1. The fourth fixed-side metal member 5F4 is welded to the fourth exposed portion 10DP and is electrically connected to the substrate member SB through the fourth fixed-side embedded member 10D.

A fifth fixed-side embedded member 10E embedded in the second pedestal portion 18D2 includes a fifth exposed portion 10EP exposed on a rear surface of the second pedestal portion 18D2. The fifth fixed-side metal member 5F5 is welded to the fifth exposed portion 10EP and is electrically connected to the substrate member SB through the fifth fixed-side embedded member 10E.

A sixth fixed-side embedded member 10F embedded in the second pedestal portion 18D2 includes a sixth exposed portion 10FP exposed on the rear surface of the second pedestal portion 18D2. The sixth fixed-side metal member 5F6 is welded to the sixth exposed portion 10FP and is electrically connected to the substrate member SB through the sixth fixed-side embedded member 10F.

A seventh fixed-side embedded member 10G embedded in the second pedestal portion 18D2 includes a seventh exposed portion 10GP exposed on a left surface of the second pedestal portion 18D2. The seventh fixed-side metal member 5F7 is welded to the seventh exposed portion 10GP and is electrically connected to the substrate member SB through the seventh fixed-side embedded member 10G.

An eighth fixed-side embedded member 10H embedded in the second pedestal portion 18D2 includes an eighth exposed portion 10HP exposed on the left surface of the second pedestal portion 18D2. The eighth fixed-side metal member 5F8 is welded to the eighth exposed portion 10HP and is electrically connected to the substrate member SB through the eighth fixed-side embedded member 10H.

A ninth fixed-side embedded member 10I embedded in the first pedestal portion 18D1 includes a ninth exposed portion 10IP exposed on the upper surface of the first pedestal portion 18D1. The first outer portion 6E1 of the first flexible metal member 6A is welded to the ninth exposed portion 10IP and is electrically connected to the substrate member SB through the ninth fixed-side embedded member 10I.

A tenth fixed-side embedded member 10J embedded in the second pedestal portion 18D2 includes a tenth exposed portion 10JP exposed on the upper surface of the second pedestal portion 18D2. The second outer portion 6E2 of the second flexible metal member 6B is welded to the tenth exposed portion 10JP and is electrically connected to the substrate member SB through the tenth fixed-side embedded member 10J.

An eleventh fixed-side embedded member 10K includes an eleventh exposed portion 10KP exposed on the upper surface of the base member 18 so as to face the first magnet 9A with an interval therebetween. The eleventh exposed portion 10KP functions as a first metal plate MG1 which is a part of the magnetic member MG constituting the biasing unit EG. Similarly, a twelfth fixed-side embedded member 10L includes a twelfth exposed portion 10LP exposed on the upper surface of the base member 18 so as to face the second magnet 9B with an interval. The twelfth exposed portion 10LP functions as a second metal plate MG2 which is another part of the magnetic member MG constituting the biasing unit EG.

The base member 18 is configured to function as a wire support member that supports one end of each of the first wire SA1 to the eighth wire SA8. With this configuration, the movable-side member MB is supported by the first wire SA1 to the eighth wire SA8, so as to be swingable about the first axis AX1 and the second axis AX2. The axial direction of the first axis AX1 and the axial direction of the second axis AX2 are perpendicular to each other.

Figure 6:
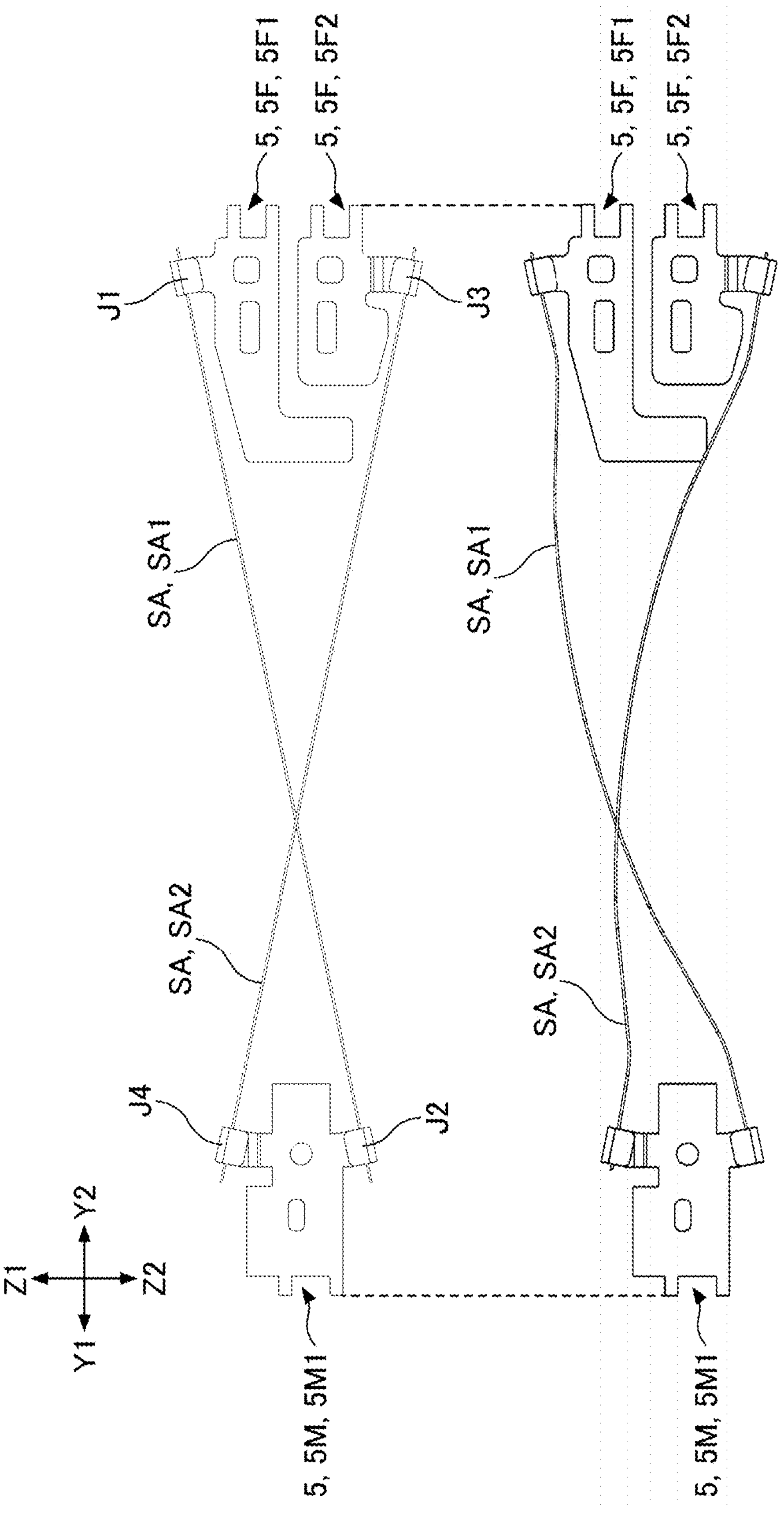
FIG. 6 is a front view of a metal member to which a shape-memory alloy wire is attached.

Next, referring to FIG. 6, the metal member 5 to which the shape-memory alloy wire SA is attached will be described. FIG. 6 is a front view of the first fixed-side metal member 5F1, the second fixed-side metal member 5F2, the first movable-side metal member 5M1, the first wire SA1, and the second wire SA2. More specifically, the positional relationship of the members illustrated in an upper figure of FIG. 6 corresponds to the positional relationship when the module drive device MD is assembled and the first wire SA1 and the second wire SA2 are supplied with an electric current, and thus both the first wire SA1 and the second wire SA2 are in a straight state. The positional relationship of the members illustrated in a lower figure of FIG. 6 corresponds to the relationship when the module drive device MD is assembled and no current is supplied to the first wire SA1 and the second wire SA2, and thus both the first wire SA1 and the second wire SA2 are in a state of slack. In FIG. 6, illustration of other members is omitted for clarity. The following description referring to FIG. 6 relates to a combination of the first wire SA1 and the second wire SA2. However, the following description referring to FIG. 6 may similarly be applied to a combination of the third wire SA3 and the fourth wire SA4, a combination of the fifth wire SA5 and the sixth wire SA6, and a combination of the seventh wire SA7 and the eighth wire SA8.

Specifically, one end of the first wire SA1 is fixed to the first fixed-side metal member 5F1 at a holding portion J1 of the first fixed-side metal member 5F1. The other end of the first wire SA1 is fixed to the first movable-side metal member 5M1 at a holding portion J2 on a lower side (Z2 side) of the first movable-side metal member 5M1. Similarly, one end of the second wire SA2 is fixed to the second fixed-side metal member 5F2 at a holding portion J3 of the second fixed-side metal member 5F2. The other end of the second wire SA2 is fixed to the first movable-side metal member 5M1 at a holding portion J4 on an upper side (Z1 side) of the first movable-side metal member 5M1.

The holding portion J1 is formed by bending a part of the first fixed-side metal member 5F1. More specifically, a part of the first fixed-side metal member 5F1 is caulked with the end portion (one end) of the first wire SA1 sandwiched therebetween to form the holding portion J1. A coating of the end portion (one end) of the first wire SA1 is peeled off before being sandwiched by the holding portion J1. The end portion (one end) of the first wire SA1 is fixed to the holding portion J1 by welding. Then, the end portion (one end) of the first wire SA1 may be protected by a protective resin. The same applies to the holding portions J2 to J4.

Further, the first wire SA1 and the second wire SA2 are arranged so as to be positionally twisted with respect to each other when a current is supplied. That is, the first wire SA1 and the second wire SA2 are arranged so as not to contact each other (become non-contact) when a current is supplied. Specifically, the first wire SA1 and the second wire SA2 cross each other when viewed from the X1 side (a direction perpendicular to a plate surface of the first fixed-side metal member 5F1) as illustrated in the upper figure of FIG. 6.

Figure 7:
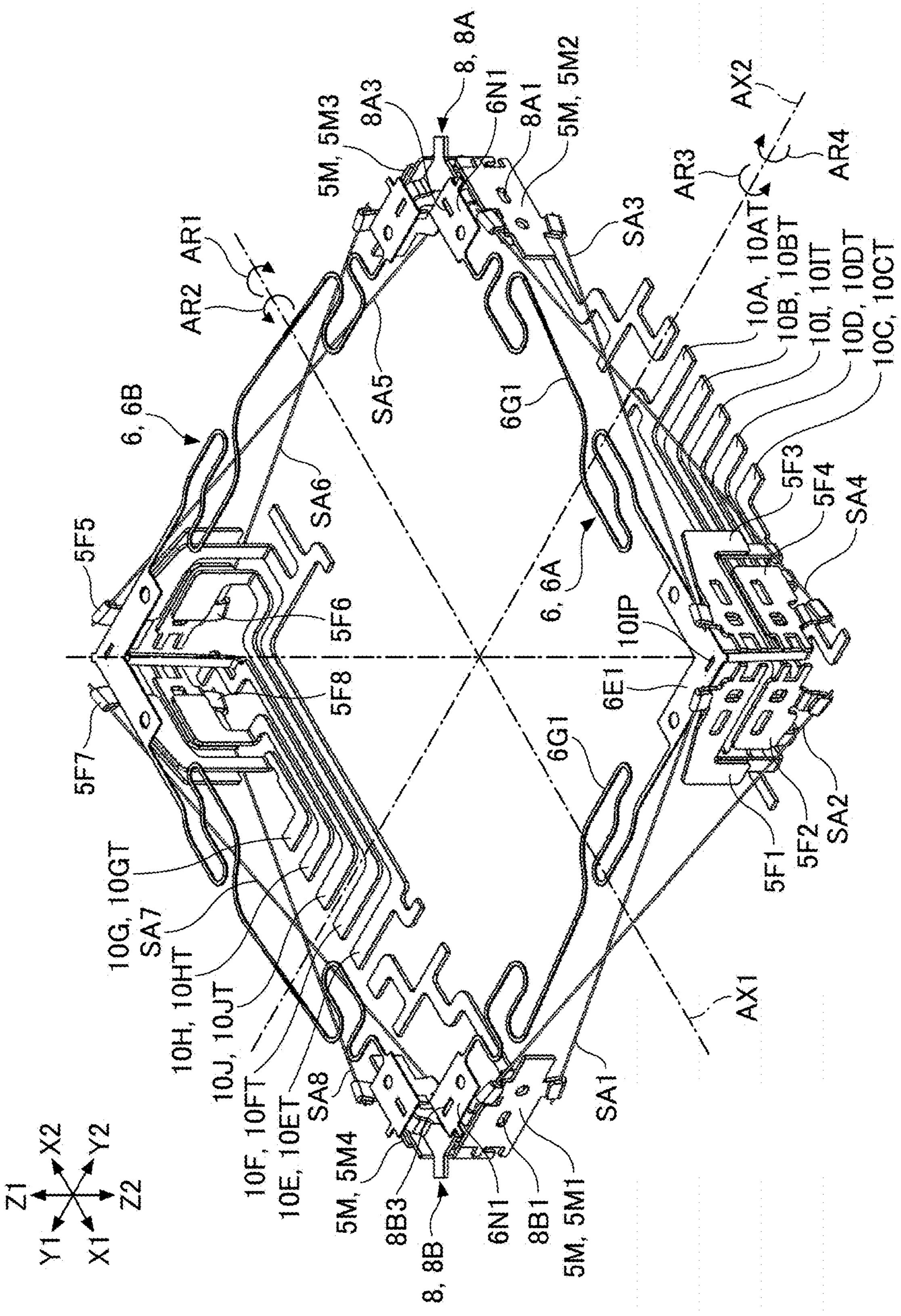
FIG. 7 is a perspective view of a metal member, the flexible metal member, the movable-side conductive member, the fixed-side embedded member, and the shape-memory alloy wire.

Next, a path of the current flowing through the shape-memory alloy wire SA will be described with reference to FIG. 7. FIG. 7 is a perspective view of the metal member 5, the flexible metal member 6, the movable-side conductive member 8, the fixed-side embedded member 10, and the shape-memory alloy wire SA.

When a first terminal portion 10AT of the first fixed-side embedded member 10A is connected to a high potential, and a ninth terminal portion 10IT of the ninth fixed-side embedded member 10I is connected to a low potential, the current flows through the first terminal portion 10AT to the first fixed-side metal member 5F1. Thereafter, the current flows through the first wire SAL and then through the first movable-side metal member 5M1. Thereafter, the current flows through the front exposed portion 8B1 and the upper-front exposed portion 8B3 of the second movable-side conductive member 8B; the first inner portion 6N1 on a left-front side, the first elastic arm portion 6G1 on a front side, and the first outer portion 6E1, of the first flexible metal member 6A; and then, the ninth exposed portion 10IP to the ninth terminal portion 10IT, of the ninth fixed-side embedded member 10I.

When the second terminal portion 10BT of the second fixed-side embedded member 10B is connected to a high potential, and the ninth terminal portion 10IT of the ninth fixed-side embedded member 10I is connected to a low potential, the current flows through the second terminal portion 10BT to the second fixed-side metal member 5F2. Thereafter, the current flows through the second wire SA2, and then through the first movable-side metal member 5M1. Thereafter, the current flows through the front exposed portion 8B1 and the upper-front exposed portion 8B3, of the second movable-side conductive member 8B; the first inner portion 6N1 on the left-front side, the first elastic arm portion 6G1 in the front, the first outer portion 6E1, of the first flexible metal member 6A; and the ninth exposed portion 10IP to the ninth terminal portion 10IT, of the ninth fixed-side embedded member 10I.

When the third terminal portion 10CT of the third fixed-side embedded member 10C is connected to a high potential, and the ninth terminal portion 10IT of the ninth fixed-side embedded member 10I is connected to a low potential, the current flows through the third terminal portion 10CT to the third fixed-side metal member 5F3. Thereafter, the current flows through the third wire SA3 and further through the second movable-side metal member 5M2. Thereafter, the current flows through the right exposed portion 8A1 and the upper-right exposed portion 8A3, of the first movable-side conductive member 8A; the first inner portion 6N1 on the right-rear side, the first elastic arm portion 6G1 on the right, and the first outer portion 6E1, of the first flexible metal member 6A; and then, the ninth exposed portion 10IP to the ninth terminal portion 10IT, of the ninth fixed-side embedded member 10I.

When a fourth terminal portion 10DT of the fourth fixed-side embedded member 10D is connected to a high potential, and the ninth terminal portion 10IT of the ninth fixed-side embedded member 10I is connected to a low potential, the current flows through the fourth terminal portion 10DT to the fourth fixed-side metal member 5F4. Thereafter, the current flows through the fourth wire SA4 and then through the second movable-side metal member 5M2. Thereafter, the current flows through the right exposed portion 8A1 and the upper-right exposed portion 8A3, of the first movable-side conductive member 8A; the first inner portion 6N1 on a left-front side, the first elastic arm portion 6G1 on a front side, and the first outer portion 6E1, of the first flexible metal member 6A; and then, the ninth exposed portion 10IP to the ninth terminal portion 10IT, of the ninth fixed-side embedded member 10I.

Even when either of the first terminal portion 10AT and the second terminal portion 10BT is connected to a high potential, the path of the current flowing from the first movable-side metal member 5M1 to the ninth terminal portion 10IT of the ninth fixed-side embedded member 10I is the same. In addition, even when any one of the third terminal portion 10CT and the fourth terminal portion 10DT is connected to a high potential, the path of the current flowing from the second movable-side metal member 5M2 to the ninth terminal portion 10IT of the ninth fixed-side embedded member 10I is the same.

Similarly, while in a state a tenth terminal portion 10JT of the tenth fixed-side embedded member 10J being connected to a low potential, when the fifth terminal portion 10ET, the sixth terminal portion 10FT, the seventh terminal portion 10GT, and the eighth terminal portion 10HT are connected to a high potential, the current flows to the fifth wire SA5, the sixth wire SA6, the seventh wire SA7, and the eighth wire SA8, respectively.

The controller CTR (see FIG. 1) located outside the module drive device MD as described above can individually control contraction in each of the first wire SA1 to the eighth wire SA8 by controlling respective voltage applied to the first terminal portion 10AT to the tenth terminal portion 10JT. Note that each of the first terminal portion 10AT to the tenth terminal portion 10JT is electrically connected to a conductor pattern on the outer portion SB1 of the substrate member SB by a jet solder or the like. The controller CTR may be configured so as to detect resistance values of the first wire SA1 to the eighth wire SA8 and perform a feedback control for contraction amounts of the first wire SA1 to the eighth wire SA8. In this case, the controller CTR can derive a position and orientation of the module holder 2 based on the resistance values of the first wire SA1 to the eighth wire SA8. In addition, the controller CTR may be disposed in the module drive device MD. The controller CTR may be a component of the module drive device MD.

In this configuration, the controller CTR utilizes a driving force generated by the contraction of the shape-memory alloy wire SA serving as the driver DM, to swing the module holder 2 around both the first axis AX1 and the second axis AX2.

Next, the swinging of the module holder 2 (not illustrated in FIG. 7) by the driver DM (shape-memory alloy wire SA) will be described with reference to FIG. 7. The swinging of the movable-side metal member 5M attached to the module holder 2 described in the following corresponds to the swinging of the module holder 2.

The controller CTR typically supplies current to each of the eight shape-memory alloy wires SA (the first wire SA1 to the eighth wire SA8) having a same effective length, and achieves a neutral state of the module drive device MD. The neutral state of the module drive device MD is, for example, a state in which the module holder 2 is positioned at a midway point in a movable range in three axial directions (X-axis direction, Y-axis direction, and Z-axis direction) that are orthogonal to each other. Typically, when the module drive device MD is in the neutral state, the module holder 2 is positioned in the center in the movable range in each of the three axial directions.

Thereafter, the controller CTR supplies a current larger than a current supplied to the remaining shape-memory alloy wires SA to some of the eight shape-memory alloy wires SA (first wire SA1 to eighth wire SA8) by a method disclosed in, for example, International Publication No. WO2022/219984, thereby swinging the module holder 2 (movable-side metal member 5M). At this time, typically, some of the eight shape-memory alloy wires SA contract, and the remaining shape-memory alloy wires SA expand.

Specifically, the controller CTR contracts each of the second wire SA2, the third wire SA3, the fourth wire SA4, and the fifth wire SA5, and thus, the movable-side metal member 5M can be swung around the first axis AX1 in a direction indicated by the arrow AR1.

The controller CTR also contracts each of the first wire SA1, the sixth wire SA6, the seventh wire SA7, and the eighth wire SA8. In this way, the movable-side metal member 5M can be swung in a direction indicated by an arrow AR2 around the first axis AX1.

The controller CTR can also swing the movable-side metal member 5M around the second axis AX2 in a direction indicated by an arrow AR3 by contracting each of the first wire SA1, the second wire SA2, the fourth wire SA4, and the seventh wire SA7.

The controller CTR can also swing the movable-side metal member 5M around the second axis AX2 in a direction indicated by an arrow AR4 by contracting each of the third wire SA3, the fifth wire SA5, the sixth wire SA6, and the eighth wire SA8.

Figure 8:
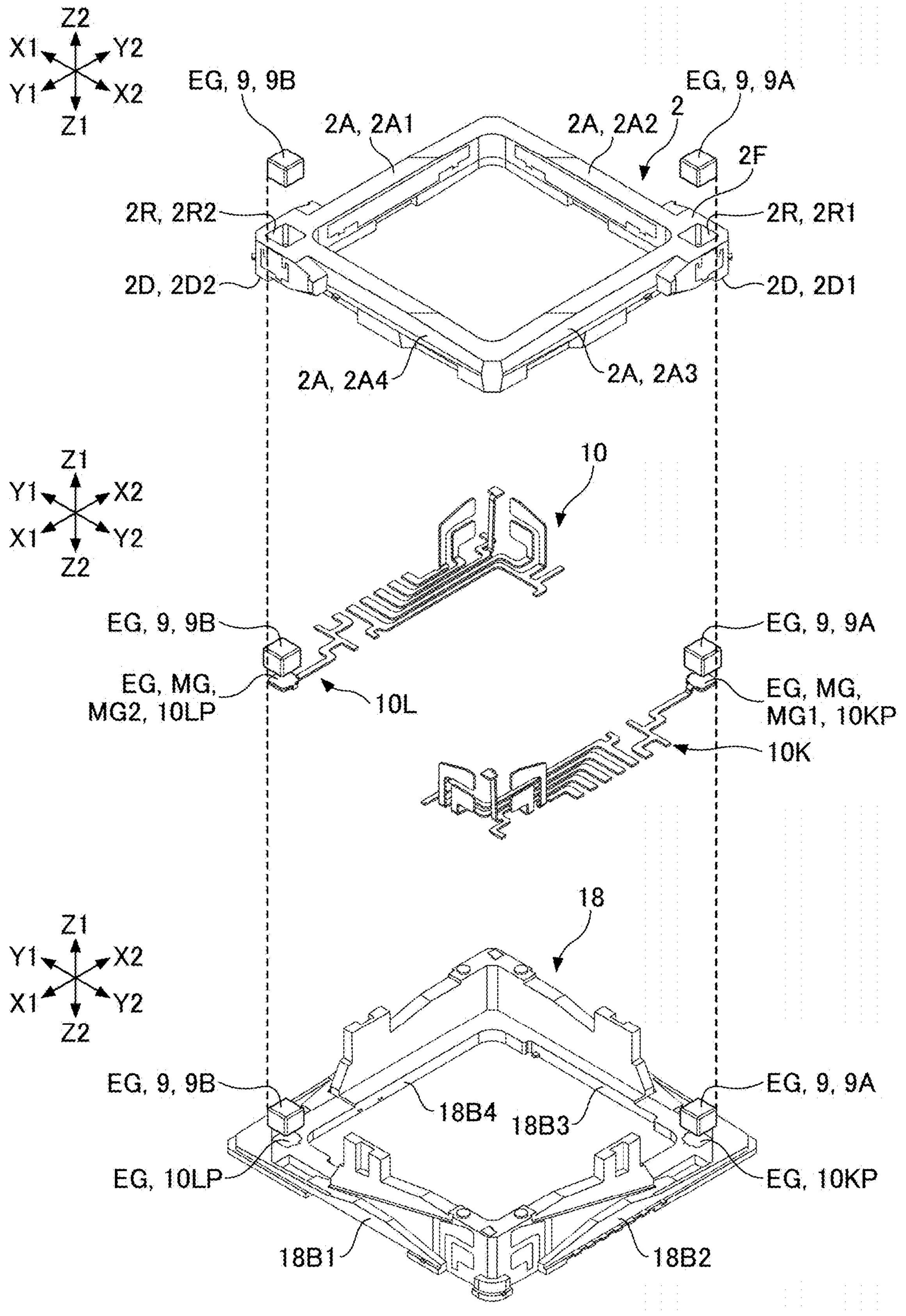
FIG. 8 is a perspective view of the module holder, the magnet, the fixed-side embedded member, and the base member.

Next, with reference to FIG. 8, the positional relationship between the magnet 9 and the magnetic member MG, constituting the biasing unit EG will be described. The magnet 9 includes the first magnet 9A fitted into the first recess 2R1 formed on the lower surface of the module holder 2 and a second magnet 9B fitted into a second recess 2R2 formed on the lower surface of the module holder 2. The magnetic member MG includes the first metal plate MG1 as the eleventh exposed portion 10KP of the eleventh fixed-side embedded member 10K that is one of the fixed-side embedded member 10, and includes the second metal plate MG2 as the twelfth exposed portion 10LP of the twelfth fixed-side embedded member 10L as another one of the fixed-side embedded member 10. FIG. 8 illustrates the positional relationship of the magnet 9 attached to the module holder 2 (the first magnet 9A and the second magnet 9B), and the fixed-side embedded member 10 (the eleventh fixed-side embedded member 10K and the twelfth fixed-side embedded member 10L) embedded in the base member 18, while the module drive device MD is in the neutral state. More specifically, an upper figure of FIG. 8 is a downward perspective view of the module holder 2 and the magnet 9. A center figure of FIG. 8 is an upward perspective view of the magnet 9 and the fixed-side embedded member 10. A lower figure of FIG. 8 is an upward perspective view of the magnet 9, the fixed-side embedded member 10, and the base member 18.

The magnetic member MG is a member that generates a magnetic attraction force with the magnet 9 attached to the module holder 2. In the example illustrated in FIG. 8, the magnetic member MG includes the first metal plate MG1 and the second metal plate MG2. Both the first metal plate MG1 and the second metal plate MG2 are made of a magnetic metal. Specifically, the first metal plate MG1 is formed as a portion of the eleventh fixed-side embedded member 10K. The second metal plate MG2 is formed as a portion of the twelfth fixed-side embedded member 10L. However, the magnetic member MG need not necessarily be the magnetic metal as long as the magnetic attraction force is generated with the magnet 9. In this case, the magnetic member MG may be a magnet. The magnetic member MG may be configured as a member independent of the fixed-side embedded member 10. In this case, the fixed-side embedded member 10 may be made of a non-magnetic material such as a non-magnetic metal. The magnetic member MG need not be embedded in the base member 18, and it may be bonded to the base member 18.

In the neutral state of the module drive device MD, as illustrated in the center figure of FIG. 8 and the lower figure of FIG. 8, the magnet 9 is disposed in the recess 2R formed on the lower surface of the module holder 2 so as to be positioned directly above the magnetic member MG with a predetermined distance from the magnetic member MG.

As illustrated in the lower figure of FIG. 8, the biasing unit EG (the magnet 9 and the magnetic member MG) is configured such that an area of the lower surface of the magnet 9 facing the magnetic member MG is substantially equal to an area of the upper surface of the magnetic member MG facing the magnet 9. This is because, when the area of the lower surface of the magnet 9 is significantly different from the area of the upper surface of the magnetic member MG, the positional relationship between the magnet 9 and the magnetic member MG when the magnet 9 is attracted by the magnetic member MG by the magnetic attraction force generated between the magnet 9 and the magnetic member MG and then settled to a position, becomes inconsistent.

More specifically, as illustrated in the center figure of FIG. 8, the first magnet 9A and the first metal plate MG1 are configured such that the area of the lower surface of the first magnet 9A facing the first metal plate MG1 is substantially equal to the area of the upper surface of the first metal plate MG1 facing the first magnet 9A. The second magnet 9B and the second metal plate MG2 are configured such that the area of the lower surface of the second magnet 9B facing the second metal plate MG2 is substantially equal to the area of the upper surface of the second metal plate MG2 facing the second magnet 9B.

In the example illustrated in FIG. 8, the magnet 9 has a substantially cubic outer shape, but may have another outer shape such as a cylinder or a hexagonal prism. That is, in the example illustrated in FIG. 8, the lower surface of the magnet 9 has an outer shape of a rectangle. However, it may have another outer shape such as a circle or a hexagon. In this case, the upper surface of the magnetic member MG preferably has the same outer shape as the lower surface of the magnet 9.

Figure 9:
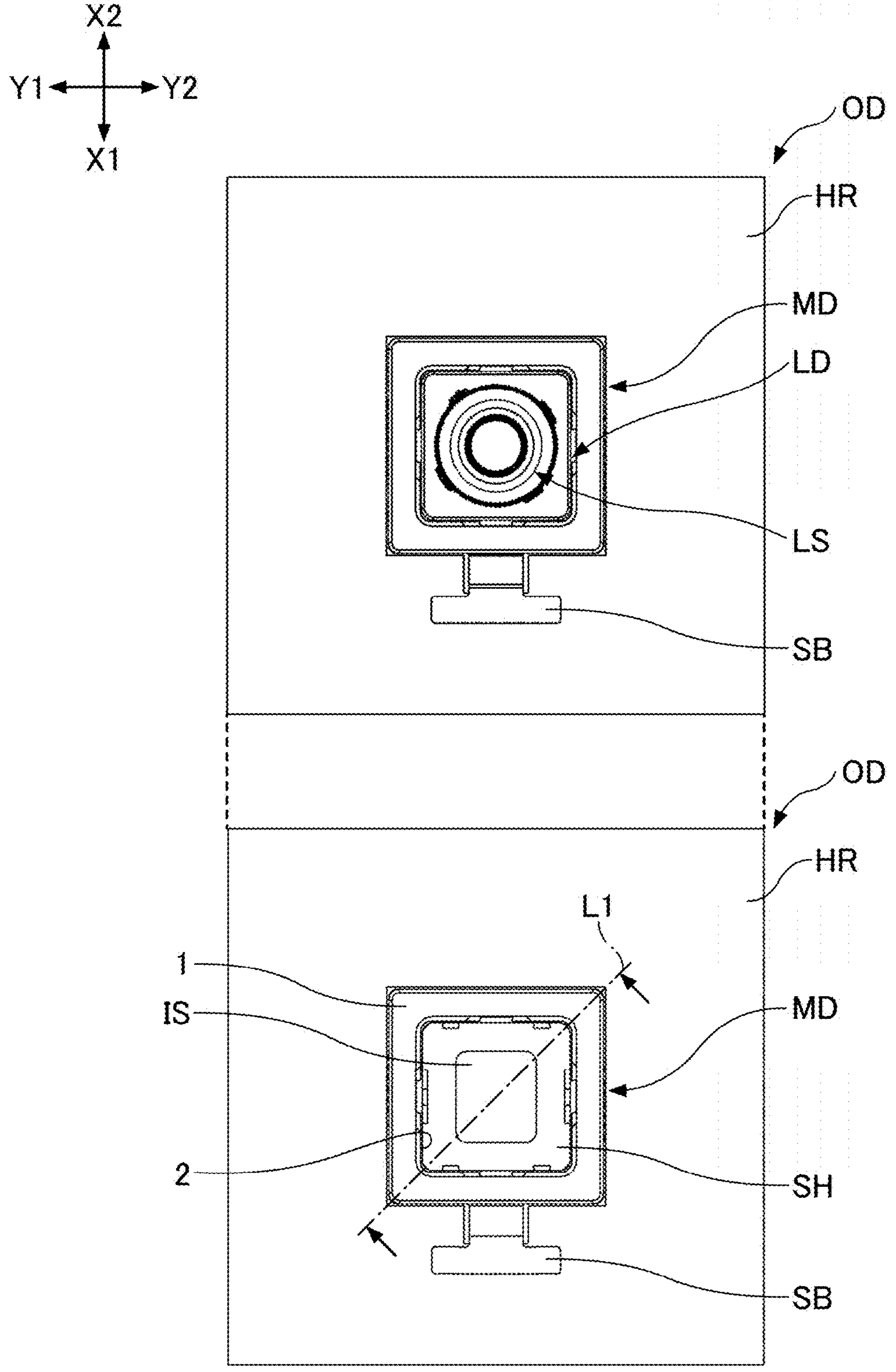
FIG. 9 is a top view of an optical device.
Figure 10:
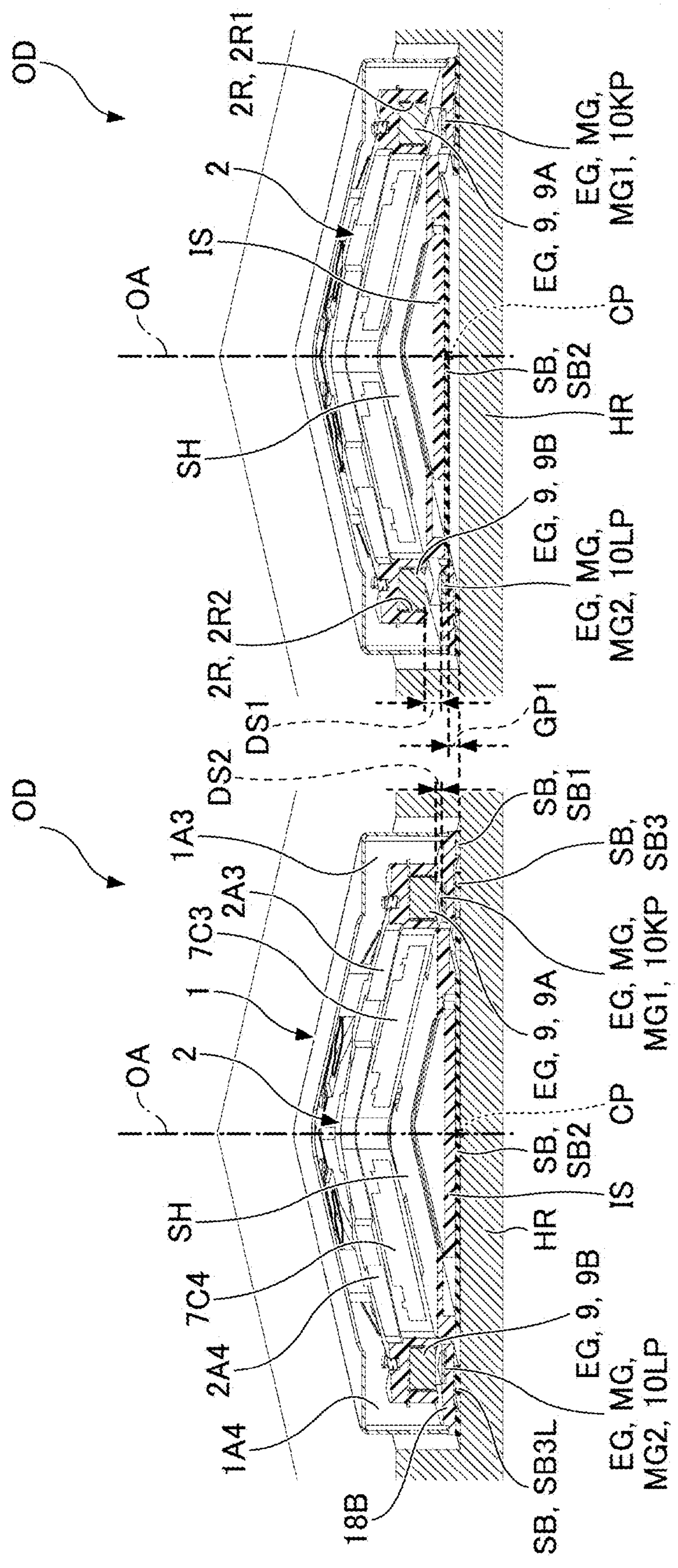
FIG. 10 is a cross-sectional view of the optical device.

Next, the operation of the biasing unit EG will be described with reference to FIGS. 9 and 10. FIG. 9 is a top view of the optical device OD. Specifically, an upper figure of FIG. 9 is a top view of the optical device OD in a state where the lens drive device LD is attached to the module drive device MD. A lower figure of FIG. 9 is a top view of the optical device OD in a state the lens drive device LD being removed from the module drive device MD. FIG. 10 is a cross-sectional view of the optical device OD, and a cross section of the optical device OD in an imaginary plane perpendicular to an XY plane including a dashed line L1 in the lower figure of FIG. 9 is illustrated. More specifically, in a left figure of FIG. 10, a state when a current is not supplied to the shape-memory alloy wire SA is illustrated. In a right figure of FIG. 10, a state when the current is supplied to the shape-memory alloy wire SA and the module drive device MD is in the neutral state is illustrated.

As illustrated in the right figure of FIG. 10, when the module drive device MD is in the neutral state, a center point CP of the inner portion SB2 of the substrate member SB to which an image sensor IS is mounted, is located at a position apart from the heat dissipation member HR by a distance GP1 in the optical axis direction (Z-axis direction). That is, the inner portion SB2 is not in contact with the heat dissipation member HR and is in a state lifted from the heat dissipation member HR with a space underneath. In the illustrated example, the center point CP of the inner portion SB2 is where the lower surface of the inner portion SB2 and the optical axis OA cross each other. In this case, the magnet 9 fitted into the recess 2R of the module holder 2 is positioned at a distance DS1 from the magnetic member MG in the optical axis direction (Z-axis direction).

When the supply of the current to the shape-memory alloy wire SA is stopped, the biasing unit EG biases the module holder 2 downward such that the inner portion SB2 of the substrate member SB and the heat dissipation member HR are brought close to each other or contact each other. Bringing the inner portion SB2 of the substrate member SB and the heat dissipation member HR close to each other means, for example, a distance between the center point CP of the inner portion SB2 and the heat dissipation member HR is smaller than a distance between the center point CP of the inner portion SB2 and the heat dissipation member HR when the module drive device MD is in the neutral state. More specifically, the magnet 9 constituting the biasing unit EG and the magnetic member MG come close to each other so as to attract each other by the magnetic force. The reason for this is that the shape-memory alloy wire SA, which has been straight, develops slack as illustrated in the lower figure of FIG. 6 due to the stop of the current supply, and the force for lifting the module holder 2 disappears. In other words, when the current is supplied, the shape-memory alloy wire SA constituting the driver DM lifts the module holder 2 against the magnetic force (attraction force) acting between the magnet 9 constituting the biasing unit EG and the magnetic member MG.

In the illustrated example, when the supply of the current to the shape-memory alloy wire SA is stopped, the lower surface of the inner portion SB2 and the upper surface of the heat dissipation member HR contact each other as illustrated in the left figure of FIG. 10. That is, the distance between the center point CP of the inner portion SB2 and the heat dissipation member HR becomes zero. At this time, the magnet 9 fitted into the recess 2R of the module holder 2 approaches the magnetic member MG to a position apart from the magnetic member MG by a distance DS2 in the optical axis direction (Z-axis direction). That is, in the illustrated example, even when the supply of current to the shape-memory alloy wire SA is stopped, the magnet 9 does not contact the magnetic member MG. This is to prevent an upward movement of the module holder 2 from being excessively hindered by the magnetic force (attraction force) when the supply of the current to the shape-memory alloy wire SA is resumed. Note that the distance DS2 is a value obtained by subtracting the distance GP1 from the distance DS1. The module holder 2 and the base member 18 do not contact each other. This is to suppress generation of wear particles due to contact between the module holder 2 and the base member 18.

Specifically, as illustrated in the left figure of FIG. 10, the entire lower surface of the inner portion SB2 contacts the upper surface of the heat dissipation member HR. As a result, the heat generated by the image sensor IS mounted on the upper surface of the inner portion SB2, is transmitted to the heat dissipation member HR through the entire lower surface of the inner portion SB2 and is released to the outside through the heat dissipation member HR. Note that, when the heat dissipation of the image sensor IS is efficiently realized, the optical device OD may be configured such that the lower surface of the inner portion SB2 and the upper surface of the heat dissipation member HR face each other with a slight gap therebetween when the supply of the current to the shape-memory alloy wire SA is stopped. That is, the inner portion SB2 and the heat dissipation member HR do not necessarily have to be in contact with each other.

As described above, the biasing unit EG formed of the magnet 9 and the magnetic member MG, is capable of moving the movable-side member MB (module holder 2) downward such that the lower surface of the inner portion SB2 and the upper surface of the heat dissipation member HR come close to or in contact with each other when supply of the current to the shape-memory alloy wire SA is stopped. Therefore, the biasing unit EG can dissipate the heat generated by the image sensor IS to the outside through the substrate member SB and the heat dissipation member HR when the supply of the current to the shape-memory alloy wire SA is stopped.

Figure 11:
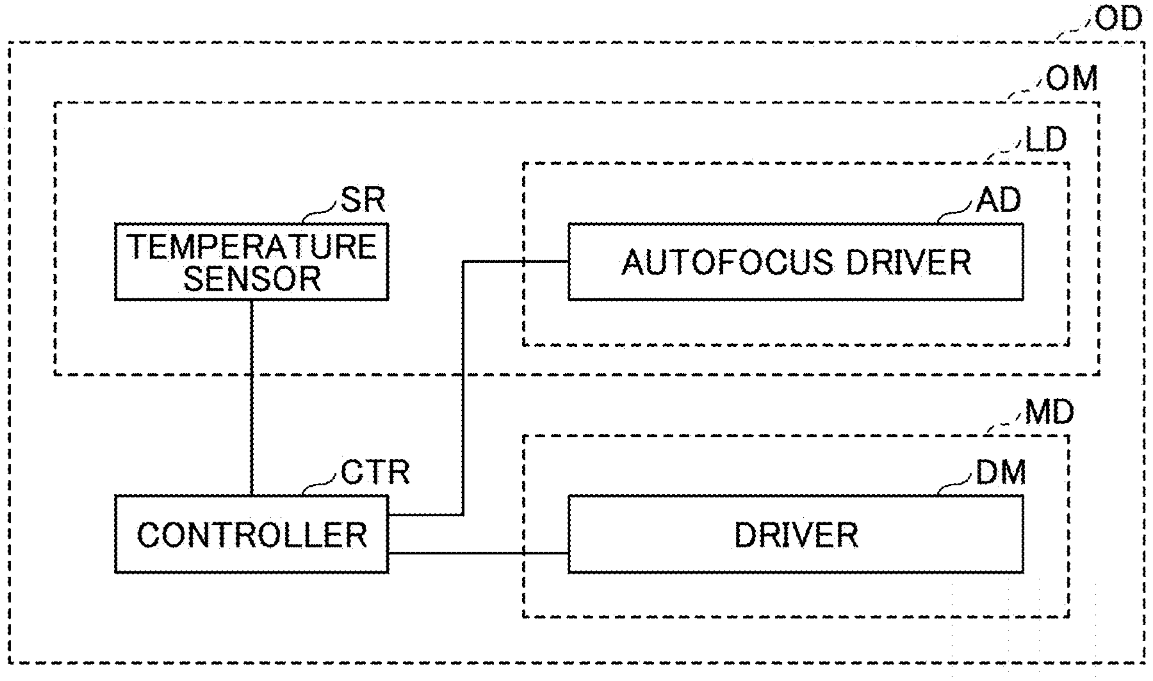
FIG. 11 is a functional block diagram of the optical device.
Figure 12:
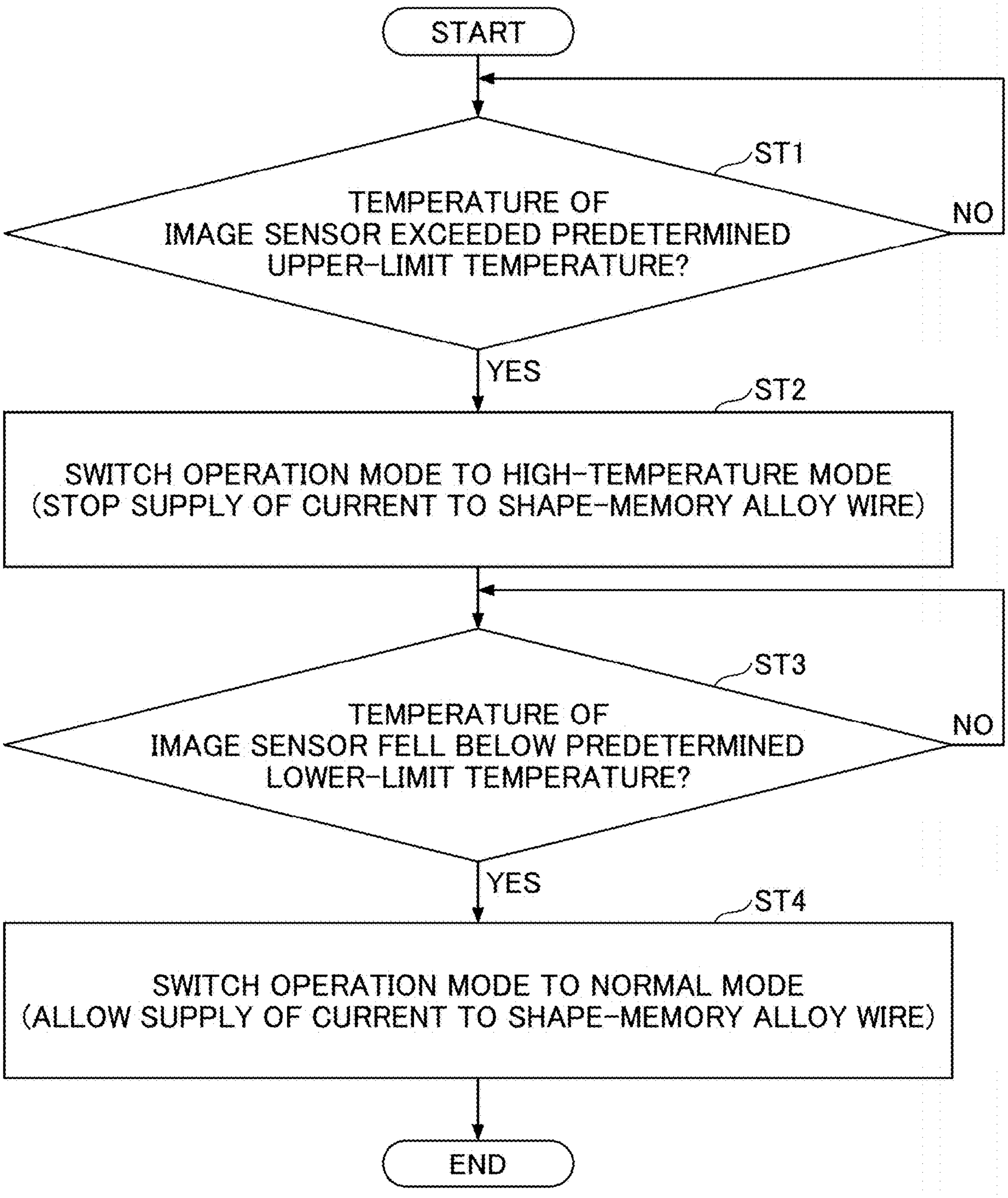
FIG. 12 is a flowchart illustrating an example of a flow of operation-mode switching processing.

Next, referring to FIGS. 11 and 12, processing (hereinafter, referred to as "operation-mode switching processing") for switching the operation mode of the module drive device MD by the controller CTR will be described. FIG. 11 is a functional block diagram of the optical device OD. FIG. 12 is a flowchart illustrating one example of a flow of the operation-mode switching processing. When electric power is supplied to the image sensor IS, the controller CTR repeatedly executes the operation-mode switching processing at a predetermined control cycle.

As illustrated in FIG. 11, the controller CTR is electrically connected to the driver DM of the module drive device MD, the temperature sensor SR mounted on the substrate member SB constituting the optical module OM, and the autofocus driver AD of the lens drive device LD constituting the optical module OM.

First, the controller CTR determines whether or not the temperature of the image sensor IS has exceeded a predetermined upper-limit temperature (step ST1). In the illustrated example, the controller CTR measures the temperature of the image sensor IS based on an output of the temperature sensor SR mounted near the image sensor IS on the upper surface of the inner portion SB2 of the substrate member SB. Then, the controller CTR compares a measured temperature of the image sensor IS with a first threshold temperature stored in the nonvolatile storage device of the controller CTR. When the measured temperature of the image sensor IS exceeds the first threshold temperature, the controller CTR determines that the temperature of the image sensor IS has exceeded the predetermined upper-limit temperature.

When the controller CTR determines that the temperature of the image sensor IS has not exceeded the predetermined upper-limit temperature ("NO" in step ST1), the controller CTR continues to measure the temperature of the image sensor IS. Whereas, when the controller CTR determines that the temperature of the image sensor IS has exceeded the predetermined upper-limit temperature ("YES" in step ST1), the controller CTR switches the operation mode of the module drive device MD to a high-temperature mode (step ST2). In the illustrated example, the controller CTR stops the supply of the current to the shape-memory alloy wires SA constituting the driver DM of the module drive device MD, while allowing supply of current to coils constituting the autofocus driver AD of the lens drive device LD. That is, the controller CTR can stop the camera-shake correction function while allowing an autofocus function to be used.

When the supply of the current to the shape-memory alloy wire SA is stopped, the biasing unit EG biases the module holder 2 downward such that the inner portion SB2 of the substrate member SB and the heat dissipation member HR contact each other, as illustrated in the left figure of FIG. 10. That is, the magnet 9 fitted into the recess 2R of the module holder 2 is attracted to the magnetic member MG, and the inner portion SB2 of the substrate member SB constituting the optical module OM held by the module holder 2 contacts the heat dissipation member HR. Accordingly, the controller CTR can start heat dissipation of the image sensor IS through the substrate member SB and the heat dissipation member HR. When the heat dissipation of the image sensor IS is started, the temperature of the image sensor IS lowers.

Thereafter, the controller CTR determines whether or not the temperature of the image sensor IS has fallen below a predetermined lower-limit temperature (step ST3). In the illustrated example, the controller CTR measures the temperature of the image sensor IS based on the output of the temperature sensor SR. Then, the controller CTR compares the measured temperature of the image sensor IS with a second threshold temperature stored in the nonvolatile storage device of the controller CTR. Then, when the measured temperature of the image sensor IS is lower than the second threshold temperature, the controller CTR determines that the temperature of the image sensor IS has fallen below the predetermined lower-limit temperature. The second threshold temperature is lower than the first threshold temperature.

When it is determined that the temperature of the image sensor IS is not below the predetermined lower-limit temperature ("NO" in step ST3), the controller CTR continues to measure the temperature of the image sensor IS. Whereas, when it is determined that the temperature of the image sensor IS is below the predetermined lower-limit temperature ("YES" in step ST3), the controller CTR switches the operation mode of the module drive device MD to a normal mode (step ST4). In the illustrated example, the controller CTR allows supply of the current to the shape-memory alloy wire SA constituting the driver DM of the module drive device MD while allowing supply of the current to the coil constituting the autofocus driver AD of the lens drive device LD. That is, the controller CTR allows the use of the camera-shake correction function while allowing use of the autofocus function.

When supply of the current to the shape-memory alloy wire SA is resumed, the shape-memory alloy wire SA moves (lifts) the module holder 2 upward such that the inner portion SB2 of the substrate member SB and the heat dissipation member HR are separated from each other, as illustrated in the right figure of FIG. 10. Therefore, the controller CTR can swing the optical module OM held by the module holder 2 about the first axis AX1 and the second axis AX2.

Thus, the controller CTR can switch the operation mode of the module drive device MD between the normal mode and the high-temperature mode according to the temperature of the image sensor IS. Therefore, the controller CTR can continue the autofocus function while stopping the camera-shake correction function when the temperature of the image sensor IS exceeds the predetermined upper-limit temperature. Furthermore, after stopping the camera-shake correction function, the controller CTR can resume the camera-shake correction function when the temperature of the image sensor IS falls below the predetermined lower-limit temperature.

As described above, the module drive device MD according to an embodiment of the present disclosure includes, as illustrated in FIGS. 1 and 2: the lens body LS; the substrate member SB; and the movable-side member MB that includes the module holder 2 capable of holding the optical module OM and the optical module OM being provided with the image sensor IS mounted on the upper surface (Z1-side surface) of the substrate member SB so as to face the lens body LS in the optical axis direction; the fixed-side member FB mounted so as not to be movable relative to the heat dissipation member HR that dissipates heat generated by the image sensor IS; the driver DM that moves the movable-side member MB with respect to the fixed-side member FB by utilizing a plurality of shape-memory alloy wires SA provided between the fixed-side member FB and the movable-side member MB. Furthermore, as illustrated in FIG. 3, the module drive device MD further includes the biasing unit EG for biasing the module holder 2 to the side (Z2 side, lower side) of the heat dissipation member HR that faces the lower surface (Z2-side surface) of the substrate member SB. The biasing unit EG biases the module holder 2 such that the substrate member SB (inner portion SB2) and the heat dissipation member HR, which are separated from each other when the shape-memory alloy wire SA is energized, come close to or in contact with each other when the shape-memory alloy wire SA is not energized.

With this configuration, when the temperature of the image sensor IS rises, by stopping energization of the shape-memory alloy wire SA, the biasing unit EG biases the substrate member SB (inner portion SB2) and the heat dissipation member HR to come close to or in contact with each other. Therefore, in this configuration, the heat generated by the image sensor IS mounted on the substrate member SB can dissipate generated heat to the outside through the substrate member SB (inner portion SB2) and the heat dissipation member HR. Therefore, in this configuration, a separate drive mechanism for moving the heat dissipation member HR is not required. In addition, in this configuration, since the heat dissipation member HR is not moved, the size of the heat dissipation member HR can be easily increased (a heat-dissipation effect can be easily enhanced) compared with the configuration provided with a drive mechanism that moves the heat dissipation member HR.

Further, the biasing unit EG may include the magnet 9 that is provided on one of either the movable-side member MB or the optical module OM, or the fixed-side member FB, and the magnetic member MG that is provided on the other of either the movable-side member MB or the optical module OM, or the fixed-side member FB. In the illustrated example, the biasing unit EG includes the magnet 9 provided on the movable-side member MB (module holder 2) and the magnetic member MG (first metal plate MG1 (the eleventh exposed portion 10KP of the eleventh fixed-side embedded member 10K) and the second metal plate MG2 (the twelfth exposed portion 10LP of the twelfth fixed-side embedded member 10L)) provided on the fixed-side member FB (base member 18). However, the biasing unit EG may include the magnet of the voice coil motor or the like constituting the autofocus driver AD and the magnet provided on the optical module OM.

This configuration provides an effect of achieving the biasing unit EG of a simple configuration.

The fixed-side member FB may also include the base member 18. In this case, the module holder 2 may include the opposing portion 2F facing the upper surface of the base member 18 in the optical axis direction. In a plan view (top view) along the optical axis direction, the plurality of magnets 9 may be provided at different positions on the opposing portion 2F. A plurality of magnetic members MG may be provided at positions facing the plurality of magnets 9 and embedded in the base member 18. In the illustrated example, as illustrated in the upper figure of FIG. 8, the magnet 9 includes the first magnet 9A fitted into and fixed with an adhesive to the first recess 2R1 formed on the lower surface of the first pedestal portion 2D1 which is a part of the opposing portion 2F, and the second magnet 9B fitted into and fixed with an adhesive to the second recess 2R2 formed on the lower surface of the second pedestal portion 2D2 which is the other part of the opposing portion 2F. Additionally, the magnetic member MG includes: the first metal plate MG1, that is a part of the eleventh fixed-side embedded member 10K embedded in the base member 18, and is exposed from the upper surface of the base member 18 so as to face the first magnet 9A; and the second metal plate MG2, that is a part of the twelfth fixed-side embedded member 10L embedded in the base member 18, and is exposed from the upper surface of the base member 18 so as to face the second magnet 9B.

This configuration provides an effect of more reliably biasing the module holder 2 by the biasing unit EG.

The driver DM may be configured to swing the module holder 2 about two axes that cross the optical axis OA. Note that these two axes are not physical axes of rotation. In the illustrated example, the driver DM is configured so as to be swingable around each of the first axis AX1 and the second axis AX2, which are imaginary axes, as illustrated in FIG. 2.

This configuration provides an advantage that the module holder 2 can cope with a larger camera shake than a camera-shake correction function achieved by parallelly moving the module holder 2 in the X-axis direction and the Y-axis direction.

The driver DM may include eight shape-memory alloy wires SA (the first wire SA1 to the eighth wire SA8) as illustrated in FIG. 7.

This configuration provides an effect of allowing a response speed of the camera shake correction function to be increased as compared with the case where the driver is configured by a smaller number of shape-memory alloy wires SA.

The biasing unit EG may be configured to bias the module holder 2 such that the substrate member SB (inner portion SB2) and the heat dissipation member HR, which are separated from each other when the temperature of the image sensor IS is equal to or lower than a predetermined temperature, come close to or in contact with each other when the temperature of the image sensor IS exceeds the predetermined temperature, as illustrated in the right figure of FIG. 10. In the example illustrated in the left figure of FIG. 10, the biasing unit EG biases the module holder 2 downward such that the inner portion SB2 of the substrate member SB and the heat dissipation member HR contact each other when the temperature of the image sensor IS exceeds the predetermined temperature.

This configuration provides an effect of preventing the temperature of the image sensor IS from remaining high for an extended period.

The temperature of the image sensor IS may be detected by the temperature sensor SR (see FIG. 2) provided on the substrate member SB.

This configuration provides an effect of allowing the temperature sensor SR to be installed in the vicinity of the image sensor IS. This configuration also provides an effect of allowing the temperature of the image sensor IS to be easily measured.

Further, the energization of the shape-memory alloy wire SA may be stopped when the temperature of the image sensor IS exceeds the predetermined temperature.

This configuration provides an effect of allowing the substrate member SB (inner portion SB2) on which the image sensor IS is mounted to be more reliably brought close to or into contact with the heat dissipation member HR when the temperature of the image sensor IS exceeds the predetermined temperature. Therefore, this configuration provides an effect of suppressing further heat generation of the image sensor IS.

The optical module OM may include a lens holder LH (see FIG. 2) that holds the lens body LS and the autofocus driver AD (see FIG. 11) that moves the lens holder LH in the optical axis direction with respect to the image sensor IS. The biasing unit EG may be configured to bias the module holder 2 such that the substrate member SB and the heat dissipation member HR are close to or in contact with each other when the shape-memory alloy wire SA is not energized, regardless of whether or not the autofocus driver AD is operable.

This configuration makes it possible to continuously use the autofocus function even when the camera-shake correction function is temporarily unavailable, and thus provides an effect of enabling long-time photographing.

The present disclosure provides a module drive device configured to achieve heat dissipation of the image sensor more efficiently.

A preferred embodiment of the present invention has been described in detail above. However, the present invention is not limited to the above-described embodiment. Various modifications and substitutions may be applied to the above-described embodiment without departing from the scope of the present invention. Further, the features described with reference to the embodiment may be appropriately combined as long as there is no technical contradiction.

For example, in the above-described embodiment, the biasing unit EG is configured by the magnet 9 and the magnetic member MG, but may be configured by a spring. That is, in the above-described embodiment, the biasing unit EG is configured to be able to use the magnetic force, but may be configured to be able to use restoring force of the spring.

What is claimed is:

1. A module drive device, comprising:

a movable-side member that includes a module holder configured to hold an optical module that includes a lens body, a substrate member, and an image sensor that is mounted on an upper surface of the substrate member so as to face the lens body in an optical axis direction;

a fixed-side member mounted so as not to be movable relative to a heat dissipation member that dissipates heat generated by the image sensor;

a driver that moves the movable-side member with respect to the fixed-side member by utilizing a plurality of shape-memory alloy wires provided between the fixed-side member and the movable-side member; and a biasing unit for biasing the module holder to a side of the heat dissipation member that faces a lower surface of the substrate member, wherein the biasing unit biases the module holder such that the substrate member and the heat dissipation member, which are separated from each other upon energization of the shape-memory alloy wire, are close to or in contact with contact each other upon de-energization of the shape-memory alloy wire.

2. The module drive device according to claim 1, wherein the biasing unit includes:

a magnet that is provided on one of either the movable-side member or the optical module, or the fixed-side member; and a magnetic member that is provided on another of either the movable-side member or the optical module, or the fixed-side member.

3. The module drive device according to claim 2, wherein the fixed-side member includes a base member, the module holder includes an opposing portion that faces an upper surface of the base member in the optical axis direction, in a plan view along the optical axis, a plurality of magnets, each being the magnet, are provided at different positions on the opposing portion, and the magnetic member is provided at positions facing the plurality of magnets and embedded in the base member.

4. The module drive device according to claim 2, wherein the driver is configured to swing the module holder about two axes that cross the optical axis.

5. The module drive device according to claim 4, wherein the driver includes eight shape-memory alloy wires, each being the shape-memory alloy wire.

6. The module drive device according to claim 1, wherein the biasing unit biases the module holder such that the substrate member and the heat dissipation member, which are separated from each other upon a temperature of the image sensor being equal to or lower than a predetermined temperature, come close to or in contact with each other in response to the temperature of the image sensor exceeding the predetermined temperature.

7. The module drive device according to claim 6, wherein the temperature of the image sensor is detected by a temperature sensor provided on the substrate member.

8. The module drive device according to claim 1, wherein the energization of the shape-memory alloy wire is stopped in response to the temperature of the image sensor exceeding a predetermined temperature.

9. The module drive device according to claim 1, wherein the optical module further includes:

a lens holder that holds the lens body; and an autofocus driver configured to move the lens holder in the optical axis direction with respect to the image sensor, and the biasing unit is configured to bias the module holder such that the substrate member and the heat dissipation member are close to or in contact with each other upon de-energization of the shape-memory alloy wire, regardless of whether or not the autofocus driver is operable.

* * * * *